US010839144B2

(12) United States Patent
Sood et al.

(10) Patent No.: US 10,839,144 B2
(45) Date of Patent: *Nov. 17, 2020

(54) REAL-TIME DOCUMENT ANNOTATION

(71) Applicant: Palantir Technologies Inc., Palo Alto, CA (US)

(72) Inventors: Ayush Sood, Menlo Park, CA (US); Amrit Saxena, Menlo Park, CA (US); Parvathy Menon, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,397

(22) Filed: Jul. 26, 2018

(65) Prior Publication Data

US 2019/0026258 A1 Jan. 24, 2019

Related U.S. Application Data

(63) Continuation of application No. 15/051,565, filed on Feb. 23, 2016, now Pat. No. 10,089,289.

(Continued)

(51) Int. Cl.
*G06F 40/169* (2020.01)
*G06F 16/23* (2019.01)
(Continued)

(52) U.S. Cl.
CPC ........ *G06F 40/169* (2020.01); *G06F 3/03543* (2013.01); *G06F 3/0482* (2013.01);
(Continued)

(58) Field of Classification Search
CPC ............. G06F 17/241; G06F 17/30002; G06F 17/30056; G06F 17/30174;
(Continued)

(56) References Cited

U.S. PATENT DOCUMENTS 4,881,179 A 11/1989 Vincent
5,109,399 A 4/1992 Thompson
(Continued)

FOREIGN PATENT DOCUMENTS

AU 2013251186 B2 11/2015
CN 102054015 B 5/2014
(Continued)

OTHER PUBLICATIONS

Brush et al., "Notification for Shared Annotation of Digital Documents", Apr. 20-25, 2002, Copyright 2002, ACM, Microsoft Research, pp. 4 (Year: 2002).*

(Continued)

*Primary Examiner* — Chau T Nguyen
(74) *Attorney, Agent, or Firm* — Schwegman Lundberg & Woessner, P.A.

(57) ABSTRACT

Aspects of the present disclosure relate to systems and methods for receiving, managing, and displaying annotations on documents in real-time. A user (e.g., an author of a document) uploads a document into a real-time annotation system, which may then generate a composite presentation based on the uploaded document. The composite presentation includes all the content of the document presented in a specially configured graphical user interface to receive and manage annotations from a plurality of user devices.

20 Claims, 8 Drawing Sheets

Related U.S. Application Data

(60) Provisional application No. 62/272,617, filed on Dec. 29, 2015.

(51) Int. Cl.

| | | |
|---|---|---|
| *G06F 16/27* | (2019.01) | |
| *G06F 16/178* | (2019.01) | |
| *G06F 16/182* | (2019.01) | |
| *G06F 16/438* | (2019.01) | |
| *G06F 3/0354* | (2013.01) | |
| *G06F 3/0482* | (2013.01) | |
| *G06F 3/0484* | (2013.01) | |
| *G06F 3/14* | (2006.01) | |

(52) U.S. Cl.
CPC ........ *G06F 3/04842* (2013.01); *G06F 3/1454* (2013.01); *G06F 16/178* (2019.01); *G06F 16/182* (2019.01); *G06F 16/23* (2019.01); *G06F 16/27* (2019.01); *G06F 16/4393* (2019.01)

(58) Field of Classification Search
CPC ......... G06F 17/30194; G06F 17/30575; G06F 3/0482; G06F 3/04842; G06F 3/1454; G06F 16/178; G06F 16/182; G06F 16/23; G06F 16/27; G06F 16/4393; G06F 3/03543; G06F 40/169
See application file for complete search history.

(56) References Cited

U.S. PATENT DOCUMENTS

| | | |
|---|---|---|
| 5,241,625 A | 8/1993 | Epard |
| 5,329,108 A | 7/1994 | Lamoure |
| 5,670,987 A | 9/1997 | Doi et al. |
| 5,781,704 A | 7/1998 | Rossmo |
| 5,845,300 A | 12/1998 | Comer et al. |
| 5,999,911 A | 12/1999 | Berg et al. |
| 6,057,757 A | 5/2000 | Arrowsmith et al. |
| 6,065,026 A | 5/2000 | Cornelia et al. |
| 6,091,956 A | 7/2000 | Hollenberg |
| 6,101,479 A | 8/2000 | Shaw |
| 6,161,098 A | 12/2000 | Wallman |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,370,538 B1 | 4/2002 | Lamping et al. |
| 6,430,305 B1 | 8/2002 | Decker |
| 6,456,997 B1 | 9/2002 | Shukla |
| 6,523,019 B1 | 2/2003 | Borthwick |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,665,683 B1 | 12/2003 | Meltzer |
| 6,714,936 B1 | 3/2004 | Nevin, III |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,850,317 B2 | 2/2005 | Mullins et al. |
| 6,877,137 B1 | 4/2005 | Rivette et al. |
| 6,944,777 B1 | 9/2005 | Belani et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,051,039 B1 | 5/2006 | Murthy et al. |
| 7,055,110 B2 | 5/2006 | Kupka |
| 7,086,028 B1 | 8/2006 | Davis et al. |
| 7,139,800 B2 | 11/2006 | Bellotti et al. |
| 7,158,878 B2 | 1/2007 | Rasmussen |
| 7,162,475 B2 | 1/2007 | Ackerman |
| 7,168,039 B2 | 1/2007 | Bertram |
| 7,171,427 B2 | 1/2007 | Witkowski et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,269,786 B1 | 9/2007 | Malloy et al. |
| 7,278,105 B1 | 10/2007 | Kitts et al. |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,392,254 B1 | 6/2008 | Jenkins |
| 7,418,656 B1 | 8/2008 | Petersen |
| 7,426,654 B2 | 9/2008 | Adams, Jr. et al. |
| 7,441,182 B2 | 10/2008 | Beilinson et al. |
| 7,441,219 B2 | 10/2008 | Perry et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak et al. |
| 7,716,140 B1 | 5/2010 | Nielsen et al. |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,765,489 B1 | 7/2010 | Shah et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,336 B1 | 5/2011 | Robin-Jan |
| 7,958,147 B1 | 6/2011 | Turner et al. |
| 7,962,281 B2 | 6/2011 | Rasmussen et al. |
| 7,962,848 B2 | 6/2011 | Bertram |
| 7,966,199 B1 | 6/2011 | Frasher et al. |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,073,857 B2 | 12/2011 | Sreekanth |
| 8,103,543 B1 | 1/2012 | Zwicky |

(56) References Cited

U.S. PATENT DOCUMENTS

| | | | |
|---|---|---|---|
| 8,134,457 B2 | 3/2012 | Velipasalar et al. | |
| 8,145,703 B2 | 3/2012 | Frishert et al. | |
| 8,185,819 B2 | 5/2012 | Sah et al. | |
| 8,191,005 B2 | 5/2012 | Baier et al. | |
| 8,214,361 B1 | 7/2012 | Sandler et al. | |
| 8,214,764 B2 | 7/2012 | Gemmell et al. | |
| 8,225,201 B2 | 7/2012 | Michael | |
| 8,229,947 B2 | 7/2012 | Fujinaga | |
| 8,230,333 B2 | 7/2012 | Decherd et al. | |
| 8,280,880 B1 | 10/2012 | Aymeloglu et al. | |
| 8,290,838 B1 | 10/2012 | Thakur et al. | |
| 8,290,942 B2 | 10/2012 | Jones et al. | |
| 8,301,464 B1 | 10/2012 | Cave et al. | |
| 8,301,904 B1 | 10/2012 | Gryaznov | |
| 8,302,855 B2 | 11/2012 | Ma et al. | |
| 8,312,367 B2 | 11/2012 | Foster | |
| 8,312,546 B2 | 11/2012 | Alme | |
| 8,352,881 B2 | 1/2013 | Champion et al. | |
| 8,368,695 B2 | 2/2013 | Howell et al. | |
| 8,392,556 B2 | 3/2013 | Goulet et al. | |
| 8,397,171 B2 | 3/2013 | Klassen et al. | |
| 8,412,707 B1 | 4/2013 | Mianji | |
| 8,447,722 B1 | 5/2013 | Ahuja et al. | |
| 8,452,790 B1 | 5/2013 | Mianji | |
| 8,463,036 B1 | 6/2013 | Ramesh et al. | |
| 8,489,331 B2 | 7/2013 | Kopf et al. | |
| 8,489,641 B1 | 7/2013 | Seefeld et al. | |
| 8,498,984 B1 | 7/2013 | Hwang et al. | |
| 8,514,082 B2 | 8/2013 | Cova et al. | |
| 8,515,207 B2 | 8/2013 | Chau | |
| 8,527,949 B1 | 9/2013 | Pleis et al. | |
| 8,554,579 B2 | 10/2013 | Tribble et al. | |
| 8,554,709 B2 | 10/2013 | Goodson et al. | |
| 8,566,353 B2 * | 10/2013 | Fink | H04N 7/17318 707/782 |
| 8,577,911 B1 | 11/2013 | Stepinski et al. | |
| 8,589,273 B2 | 11/2013 | Creeden et al. | |
| 8,620,641 B2 | 12/2013 | Farnsworth et al. | |
| 8,635,520 B2 * | 1/2014 | Christiansen | G06F 40/169 715/230 |
| 8,646,080 B2 | 2/2014 | Williamson et al. | |
| 8,682,696 B1 | 3/2014 | Shanmugam | |
| 8,688,573 B1 | 4/2014 | Rukonic et al. | |
| 8,689,108 B1 | 4/2014 | Duffield et al. | |
| 8,713,467 B1 | 4/2014 | Goldenberg et al. | |
| 8,726,379 B1 | 5/2014 | Stiansen et al. | |
| 8,732,574 B2 | 5/2014 | Burr et al. | |
| 8,739,278 B2 | 5/2014 | Varghese | |
| 8,742,934 B1 | 6/2014 | Sarpy, Sr. et al. | |
| 8,745,516 B2 | 6/2014 | Mason et al. | |
| 8,781,169 B2 | 7/2014 | Jackson et al. | |
| 8,799,313 B2 | 8/2014 | Satlow | |
| 8,799,799 B1 | 8/2014 | Cervelli et al. | |
| 8,807,948 B2 | 8/2014 | Luo et al. | |
| 8,812,960 B1 | 8/2014 | Sun et al. | |
| 8,830,322 B2 | 9/2014 | Nerayoff et al. | |
| 8,832,594 B1 | 9/2014 | Thompson et al. | |
| 8,868,537 B1 | 10/2014 | Colgrove et al. | |
| 8,917,274 B2 | 12/2014 | Ma et al. | |
| 8,924,872 B1 | 12/2014 | Bogomolov et al. | |
| 8,930,874 B2 | 1/2015 | Duff et al. | |
| 8,938,686 B1 | 1/2015 | Erenrich et al. | |
| 8,984,390 B2 | 3/2015 | Aymeloglu et al. | |
| 9,058,315 B2 | 6/2015 | Burr | |
| 9,165,100 B2 | 10/2015 | Begur et al. | |
| 9,286,373 B2 | 3/2016 | Elliot et al. | |
| 9,348,880 B1 | 5/2016 | Kramer et al. | |
| 9,753,921 B1 * | 9/2017 | DeVincenzi | G06F 40/169 |
| 10,042,832 B1 * | 8/2018 | Vagell | G06F 17/241 |
| 2001/0021936 A1 | 9/2001 | Bertram | |
| 2002/0032677 A1 | 3/2002 | Morgenthaler et al. | |
| 2002/0033848 A1 | 3/2002 | Sciammarella et al. | |
| 2002/0091707 A1 | 7/2002 | Keller | |
| 2002/0095360 A1 | 7/2002 | Joao | |
| 2002/0095658 A1 | 7/2002 | Shulman et al. | |
| 2002/0103705 A1 | 8/2002 | Brady | |
| 2002/0116120 A1 | 8/2002 | Ruiz et al. | |
| 2002/0145620 A1 | 10/2002 | Smith et al. | |
| 2002/0174201 A1 | 11/2002 | Ramer et al. | |
| 2002/0196229 A1 | 12/2002 | Chen et al. | |
| 2003/0028560 A1 | 2/2003 | Kudrolli et al. | |
| 2003/0036927 A1 | 2/2003 | Bowen | |
| 2003/0039948 A1 | 2/2003 | Donahue | |
| 2003/0061132 A1 | 3/2003 | Mason, Sr. et al. | |
| 2003/0093755 A1 | 5/2003 | O'Carroll | |
| 2003/0126102 A1 | 7/2003 | Borthwick | |
| 2003/0144868 A1 | 7/2003 | MacIntyre et al. | |
| 2003/0163352 A1 | 8/2003 | Surpin et al. | |
| 2003/0225755 A1 | 12/2003 | Iwayama et al. | |
| 2003/0229848 A1 | 12/2003 | Arend et al. | |
| 2004/0032432 A1 | 2/2004 | Baynger | |
| 2004/0034570 A1 | 2/2004 | Davis | |
| 2004/0044648 A1 | 3/2004 | Anfindsen et al. | |
| 2004/0064256 A1 | 4/2004 | Barinek et al. | |
| 2004/0078451 A1 | 4/2004 | Dietz et al. | |
| 2004/0085318 A1 | 5/2004 | Hassler et al. | |
| 2004/0095349 A1 | 5/2004 | Bito et al. | |
| 2004/0143602 A1 | 7/2004 | Ruiz et al. | |
| 2004/0163039 A1 | 8/2004 | Gorman | |
| 2004/0193600 A1 | 9/2004 | Kaasten et al. | |
| 2004/0205492 A1 | 10/2004 | Newsome | |
| 2004/0236688 A1 | 11/2004 | Bozeman | |
| 2004/0236711 A1 | 11/2004 | Nixon et al. | |
| 2004/0260702 A1 | 12/2004 | Cragun et al. | |
| 2005/0010472 A1 | 1/2005 | Quatse et al. | |
| 2005/0027705 A1 | 2/2005 | Sadri et al. | |
| 2005/0028094 A1 | 2/2005 | Allyn | |
| 2005/0039116 A1 | 2/2005 | Slack-Smith | |
| 2005/0080769 A1 | 4/2005 | Gemmell et al. | |
| 2005/0086207 A1 | 4/2005 | Heuer et al. | |
| 2005/0091186 A1 | 4/2005 | Elish | |
| 2005/0125715 A1 | 6/2005 | Di Franco et al. | |
| 2005/0162523 A1 | 7/2005 | Darrell et al. | |
| 2005/0180330 A1 | 8/2005 | Shapiro | |
| 2005/0182793 A1 | 8/2005 | Keenan et al. | |
| 2005/0183005 A1 | 8/2005 | Denoue et al. | |
| 2005/0188016 A1 | 8/2005 | Vdaygiri et al. | |
| 2005/0246327 A1 | 11/2005 | Yeung et al. | |
| 2005/0251786 A1 | 11/2005 | Citron et al. | |
| 2006/0026120 A1 | 2/2006 | Carolan et al. | |
| 2006/0026170 A1 | 2/2006 | Kreitler et al. | |
| 2006/0026561 A1 | 2/2006 | Bauman et al. | |
| 2006/0031779 A1 | 2/2006 | Theurer et al. | |
| 2006/0045470 A1 | 3/2006 | Poslinski et al. | |
| 2006/0053097 A1 | 3/2006 | King et al. | |
| 2006/0053170 A1 | 3/2006 | Hill et al. | |
| 2006/0059139 A1 | 3/2006 | Robinson | |
| 2006/0059423 A1 | 3/2006 | Lehmann et al. | |
| 2006/0074866 A1 | 4/2006 | Chamberlain et al. | |
| 2006/0080139 A1 | 4/2006 | Mainzer | |
| 2006/0080619 A1 | 4/2006 | Carlson et al. | |
| 2006/0129746 A1 | 6/2006 | Porter | |
| 2006/0136513 A1 | 6/2006 | Ngo et al. | |
| 2006/0139375 A1 | 6/2006 | Rasmussen et al. | |
| 2006/0143075 A1 | 6/2006 | Carr et al. | |
| 2006/0149596 A1 | 7/2006 | Surpin et al. | |
| 2006/0155654 A1 | 7/2006 | Plessis et al. | |
| 2006/0178915 A1 | 8/2006 | Chao | |
| 2006/0203337 A1 | 9/2006 | White | |
| 2006/0218637 A1 | 9/2006 | Thomas et al. | |
| 2006/0241974 A1 | 10/2006 | Chao et al. | |
| 2006/0242040 A1 | 10/2006 | Rader | |
| 2006/0242630 A1 | 10/2006 | Koike et al. | |
| 2006/0265417 A1 | 11/2006 | Amato et al. | |
| 2006/0271277 A1 | 11/2006 | Hu et al. | |
| 2006/0277460 A1 | 12/2006 | Forstall et al. | |
| 2006/0279630 A1 | 12/2006 | Aggarwal et al. | |
| 2007/0000999 A1 | 1/2007 | Kubo et al. | |
| 2007/0011150 A1 | 1/2007 | Frank | |
| 2007/0016363 A1 | 1/2007 | Huang et al. | |
| 2007/0018986 A1 | 1/2007 | Hauser | |
| 2007/0038962 A1 | 2/2007 | Fuchs et al. | |
| 2007/0043686 A1 | 2/2007 | Teng et al. | |
| 2007/0057966 A1 | 3/2007 | Ohno et al. | |

(56) References Cited

U.S. PATENT DOCUMENTS

| | | |
|---|---|---|
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0113164 A1 | 5/2007 | Hansen et al. |
| 2007/0118794 A1 | 5/2007 | Hollander et al. |
| 2007/0136095 A1 | 6/2007 | Weinstein |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0245339 A1 | 10/2007 | Bauman et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0016155 A1 | 1/2008 | Khalatian |
| 2008/0040684 A1 | 2/2008 | Crump et al. |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone |
| 2008/0091693 A1 | 4/2008 | Murthy |
| 2008/0104019 A1 | 5/2008 | Nath |
| 2008/0109714 A1 | 5/2008 | Kumar et al. |
| 2008/0126951 A1 | 5/2008 | Sood et al. |
| 2008/0162616 A1 | 7/2008 | Gross et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0249820 A1 | 10/2008 | Pathria et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288475 A1 | 11/2008 | Kim et al. |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0024962 A1 | 1/2009 | Gotz |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0043801 A1 | 2/2009 | LeClair et al. |
| 2009/0055251 A1 | 2/2009 | Shah et al. |
| 2009/0088964 A1 | 4/2009 | Schaaf et al. |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0112910 A1 | 4/2009 | Picault et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed, Jr. et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0187546 A1 | 7/2009 | Whyte |
| 2009/0199106 A1 | 8/2009 | Jonsson et al. |
| 2009/0216562 A1 | 8/2009 | Faulkner et al. |
| 2009/0222400 A1 | 9/2009 | Kupershmidt et al. |
| 2009/0222760 A1 | 9/2009 | Halverson et al. |
| 2009/0234720 A1 | 9/2009 | George et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford et al. |
| 2009/0307049 A1 | 12/2009 | Elliott, Jr. et al. |
| 2009/0313463 A1 | 12/2009 | Pang et al. |
| 2009/0319891 A1 | 12/2009 | MacKinlay et al. |
| 2010/0004857 A1 | 1/2010 | Pereira et al. |
| 2010/0011282 A1 | 1/2010 | Dollard et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070844 A1 | 3/2010 | Aymeloglu et al. |
| 2010/0076813 A1 | 3/2010 | Ghosh et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0223260 A1 | 9/2010 | Wu |
| 2010/0238174 A1 | 9/2010 | Haub et al. |
| 2010/0250412 A1 | 9/2010 | Wagner |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0293174 A1 | 11/2010 | Bennett |
| 2010/0306713 A1 | 12/2010 | Geisner et al. |
| 2010/0306722 A1 | 12/2010 | Lehoty et al. |
| 2010/0313239 A1 | 12/2010 | Chakra et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0074788 A1 | 3/2011 | Regan et al. |
| 2011/0074811 A1 | 3/2011 | Hanson et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0113320 A1 | 5/2011 | Neff et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0161409 A1 | 6/2011 | Nair et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0208724 A1 | 8/2011 | Jones et al. |
| 2011/0218934 A1 | 9/2011 | Elser |
| 2011/0219450 A1 | 9/2011 | Mcdougal et al. |
| 2011/0225198 A1 | 9/2011 | Edwards et al. |
| 2011/0225482 A1 | 9/2011 | Chan et al. |
| 2011/0270705 A1 | 11/2011 | Parker |
| 2011/0270922 A1 | 11/2011 | Jones et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004894 A1 | 1/2012 | Butler et al. |
| 2012/0019559 A1 | 1/2012 | Siler et al. |

(56) References Cited

U.S. PATENT DOCUMENTS

| | | |
|---|---|---|
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0059853 A1 | 3/2012 | Jagota |
| 2012/0065987 A1 | 3/2012 | Farooq et al. |
| 2012/0066296 A1 | 3/2012 | Appleton et al. |
| 2012/0079363 A1 | 3/2012 | Folting et al. |
| 2012/0084117 A1 | 4/2012 | Tavares et al. |
| 2012/0084184 A1 | 4/2012 | Raleigh et al. |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159399 A1 | 6/2012 | Bastide et al. |
| 2012/0173985 A1 | 7/2012 | Peppel |
| 2012/0188252 A1 | 7/2012 | Law |
| 2012/0196557 A1 | 8/2012 | Reich et al. |
| 2012/0196558 A1 | 8/2012 | Reich et al. |
| 2012/0197657 A1 | 8/2012 | Prodanovic |
| 2012/0197660 A1 | 8/2012 | Prodanovich |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0323829 A1 | 12/2012 | Stokes |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0016106 A1 | 1/2013 | Yip et al. |
| 2013/0046842 A1 | 2/2013 | Muntz et al. |
| 2013/0055264 A1 | 2/2013 | Burr et al. |
| 2013/0124567 A1 | 2/2013 | Balinsky et al. |
| 2013/0060786 A1 | 3/2013 | Serrano et al. |
| 2013/0061169 A1 | 3/2013 | Pearcy |
| 2013/0073377 A1 | 3/2013 | Heath |
| 2013/0078943 A1 | 3/2013 | Biage et al. |
| 2013/0097481 A1 | 4/2013 | Kotler et al. |
| 2013/0097482 A1 | 4/2013 | Marantz et al. |
| 2013/0101159 A1 | 4/2013 | Chao et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151305 A1 | 6/2013 | Akinola et al. |
| 2013/0151453 A1 | 6/2013 | Bhanot et al. |
| 2013/0157234 A1 | 6/2013 | Gulli et al. |
| 2013/0166480 A1 | 6/2013 | Popescu et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0238616 A1 | 9/2013 | Rose et al. |
| 2013/0246170 A1 | 9/2013 | Gross et al. |
| 2013/0246901 A1 | 9/2013 | Massand |
| 2013/0251233 A1 | 9/2013 | Yang et al. |
| 2013/0254126 A1* | 9/2013 | Koenig .................. G06Q 10/00 705/311 |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2014/0006921 A1* | 1/2014 | Gopinath .............. G06F 17/241 715/230 |
| 2014/0019843 A1 | 1/2014 | Schmidt |
| 2014/0019936 A1 | 1/2014 | Cohanoff |
| 2014/0026025 A1 | 1/2014 | Smith |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0059010 A1* | 2/2014 | Uchida ................ H04N 7/155 707/661 |
| 2014/0059038 A1 | 2/2014 | Mcpherson et al. |
| 2014/0068487 A1 | 3/2014 | Steiger et al. |
| 2014/0089339 A1 | 3/2014 | Siddiqui et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129936 A1 | 5/2014 | Richards et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0222793 A1 | 8/2014 | Sadkin et al. |
| 2014/0244284 A1 | 8/2014 | Smith |
| 2014/0267294 A1 | 9/2014 | Ma et al. |
| 2014/0267295 A1 | 9/2014 | Sharma et al. |
| 2014/0279824 A1 | 9/2014 | Tamayo |
| 2014/0304618 A1 | 10/2014 | Carriero et al. |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0358829 A1 | 12/2014 | Hurwitz |
| 2015/0026622 A1 | 1/2015 | Roaldson et al. |
| 2015/0073954 A1 | 3/2015 | Braff |
| 2015/0089353 A1 | 3/2015 | Folkening |
| 2015/0100907 A1 | 4/2015 | Erenrich et al. |
| 2015/0106379 A1 | 4/2015 | Elliot et al. |
| 2015/0178259 A1 | 6/2015 | Davis et al. |
| 2015/0186483 A1 | 7/2015 | Tappan et al. |
| 2015/0212663 A1 | 7/2015 | Papale et al. |
| 2015/0254220 A1 | 9/2015 | Burr et al. |
| 2015/0339034 A1 | 11/2015 | Garcia |
| 2015/0370772 A1* | 12/2015 | Wang .................. G06F 17/241 715/230 |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0147399 A1* | 5/2016 | Berajawala .......... G06F 17/241 715/753 |
| 2016/0162519 A1 | 6/2016 | Stowe et al. |
| 2016/0210270 A1 | 7/2016 | Kelly et al. |
| 2016/0284127 A1* | 9/2016 | Rakshit ............ H04N 21/25866 |
| 2016/0308940 A1* | 10/2016 | Procopio ............ G06F 3/04842 |
| 2017/0060829 A1* | 3/2017 | Bhatt .................. G06F 17/241 |
| 2017/0161246 A1 | 6/2017 | Klima |
| 2017/0185575 A1 | 6/2017 | Sood et al. |

FOREIGN PATENT DOCUMENTS

| | | |
|---|---|---|
| DE | 102014103482 A1 | 9/2014 |
| EP | 1672527 A2 | 6/2006 |
| EP | 2551799 A2 | 1/2013 |
| EP | 2778977 A1 | 9/2014 |
| EP | 2993595 A1 | 3/2016 |
| EP | 3002691 A1 | 4/2016 |
| EP | 3009943 A1 | 4/2016 |
| EP | 3032441 A2 | 6/2016 |
| EP | 3188052 A2 | 7/2017 |
| GB | 2516155 A | 1/2015 |
| NZ | 624557 A | 8/2014 |
| WO | WO-2000009529 A2 | 2/2000 |
| WO | WO-01025906 A1 | 4/2001 |

(56) References Cited

FOREIGN PATENT DOCUMENTS

| WO | WO-2001088750 A1 | 11/2001 |
|---|---|---|
| WO | WO-2005104736 A2 | 11/2005 |
| WO | WO-2007133206 A1 | 11/2007 |
| WO | WO-2009061501 A1 | 5/2009 |
| WO | WO-2010000014 A1 | 1/2010 |
| WO | WO-2010030913 A2 | 3/2010 |
| WO | WO-2010030914 A2 | 3/2010 |
| WO | WO-2012119008 A2 | 9/2012 |
| WO | WO-2015183397 A1 | 12/2015 |

OTHER PUBLICATIONS

Yang et al., "A Collaborative Multimedia Annotation Tool for Enhancing Knowledge Sharing in CSCL", Jan. 20, 2011, National Central University, Taiwan, Northern Illinois University, USA, University of Illinois at Chicago, USA, pp. 21 (Year: 2011).*
"7 Things You Should Know About . . . Collaborative Annotation", (2009), 2 pgs.
"A First Look: Predicting Market Demand for Food Retails using a Huff Analysis", TRF Policy Solutions, CDFI Fund, Capacity Building Initiative, (Jul. 2012), 1-30.
"A Quick Guide to UniProtKB Swiss-Prot & TrEMBL", UniProt Consortium, Ongoing and future developments at the Universal Protein Resource, (Sep. 2011), 1-2.
"About connecting shapes", Microsoft Office—Visio, [Online] retrieved from the internet: <http://office.microsoft.com/enus/visio-help/about-connecting-shapes-HP085050369.aspx>, (Aug. 4, 2011), 6 pgs.
"Add and glue connectors with the Connector tool", Microsoft Office—Visio, [Online] retrieved from the internet: <http://office.microsoft.com/en-us/visio-help/add-and-glue-connectors-with-the-connector-tool-HA010048532.aspx?CTT =1 >, (Aug. 4, 2011), 1 pg.
"U.S. Appl. No. 12/556,318, Notice of Allowance dated Apr. 11, 2016", 65 pgs.
"U.S. Appl. No. 12/556,321, Final Office Action dated Feb. 25, 2016", 26 pgs.
"U.S. Appl. No. 12/556,321, Final Office Action dated Jun. 6, 2012", 27 pgs.
"U.S. Appl. No. 12/556,321, Non Final Office Action dated Jul. 7, 2015", 18 pgs.
"U.S. Appl. No. 12/556,321, Non Final Office Action dated Dec. 7, 2011", 18 pgs.
"U.S. Appl. No. 13/669,274, Advisory Action dated Aug. 26, 2015", 7 pgs.
"U.S. Appl. No. 13/669,274, Final Office Action dated May 6, 2015", 12 pgs.
"U.S. Appl. No. 13/669,274, Non Final Office Action dated May 2, 2016", 25 pgs.
"U.S. Appl. No. 13/827,491, Final Office Action dated Jun. 22, 2015", 28 pgs.
"U.S. Appl. No. 13/827,491, Non Final Office Action dated Oct. 9, 2015", 16 pgs.
"U.S. Appl. No. 13/917,571, Issue Notification dated Aug. 5, 2014", 1 pg.
"U.S. Appl. No. 14/102,394, Notice of Allowance dated Aug. 25, 2014", 13 pgs.
"U.S. Appl. No. 14/102,394, Office Action dated Mar. 27, 2014", 16 pgs.
"U.S. Appl. No. 14/108,187, Applicant-Initiated Interview Summary dated Apr. 17, 2014", 8 pgs.
"U.S. Appl. No. 14/108,187, First Action Interview dated Mar. 20, 2014", 7 pgs.
"U.S. Appl. No. 14/108,187, Notice of Allowance dated Aug. 29, 2014", 8 pgs.
"U.S. Appl. No. 14/135,289, First Action Interview Office Action Summary dated Jul. 7, 2014", 12 pgs.
"U.S. Appl. No. 14/135,289, First Action Interview Pilot Program Pre-Interview Communication dated Apr. 16, 2014", 8 pgs.

"U.S. Appl. No. 14/135,289, Notice of Allowance dated Oct. 14, 2014", 9 pgs.
"U.S. Appl. No. 14/148,568, Final Office Action dated Oct. 22, 2014", 32 pgs.
"U.S. Appl. No. 14/192,767 Corrected Notice of Allowability dated Apr. 20, 2015", 6 pgs.
"U.S. Appl. No. 14/192,767, First Action Interview Office Action Summary dated Sep. 24, 2014", 8 pgs.
"U.S. Appl. No. 14/192,767, First Action Interview Pilot Program Pre-Interview Communication dated May 6, 2014", 23 pgs.
"U.S. Appl. No. 14/192,767, Notice of Allowance dated Dec. 16, 2014", 9 pgs.
"U.S. Appl. No. 14/196,814, First Action Interview Office Action Summary dated Aug. 13, 2014", 8 pgs.
"U.S. Appl. No. 14/222,364, Non Final Office Action dated Dec. 9, 2015", 38 pgs.
"U.S. Appl. No. 14/225,006, Advisory Action dated Dec. 21, 2015", 4 pgs.
"U.S. Appl. No. 14/225,006, First Action Interview Pre-Interview Communication dated Sep. 10, 2014", 4 pgs.
"U.S. Appl. No. 14/225,084, First Action Interview Pre-Interview Communication dated Sep. 2, 2014", 17 pgs.
"U.S. Appl. No. 14/225,160, First Action Interview Pre-Interview Communication dated Oct. 22, 2014", 6 pgs.
"U.S. Appl. No. 14/265,637, First Action Interview Pre-Interview Communication dated Sep. 26, 2014", 6 pgs.
"U.S. Appl. No. 14/265,637, Notice of Allowance dated Feb. 13, 2015", 11 pgs.
"U.S. Appl. No. 14/268,964, First Action Interview Pre-Interview Communication dated Sep. 3, 2014", 13 pgs.
"U.S. Appl. No. 14/268,964, Non Final Office Action dated Jul. 11, 2014", 10 pgs.
"U.S. Appl. No. 14/268,964, Notice of Allowance dated Dec. 3, 2014", 13 pgs.
"U.S. Appl. No. 14/289,596, Final Office Action dated Aug. 5, 2015", 15 pgs.
"U.S. Appl. No. 14/289,596, First Action Interview Pre-Interview Communication dated Jul. 18, 2014", 4 pgs.
"U.S. Appl. No. 14/289,599, First Action Interview Pre-Interview Communication dated Jul. 22, 2014", 5 pgs.
"U.S. Appl. No. 14/294,098, Final Office Action dated Nov. 6, 2014", 22 pgs.
"U.S. Appl. No. 14/294,098, First Action Interview Pre-Interview Communication dated Aug. 15, 2014", 17 pgs.
"U.S. Appl. No. 14/294,098, Notice of Allowance dated Dec. 29, 2014", 9 pgs.
"U.S. Appl. No. 14/306,138, First Action Interview Pre-Interview Communication dated Sep. 23, 2014", 5 pgs.
"U.S. Appl. No. 14/306,147, First Action Interview—Pre-Interview Communication dated Sep. 9, 2014", 6 pgs.
"U.S. Appl. No. 14/306,154, First Action Interview Pre-Interview Communication dated Sep. 9, 2014", 4 pgs.
"U.S. Appl. No. 14/319,765, First Action Interview Pre-Interview Communication dated Nov. 25, 2014", 4 pgs.
"U.S. Appl. No. 14/323,935, First Action Interview Pre-Interview Communication dated Nov. 28, 2014", 4 pgs.
"U.S. Appl. No. 14/326,738, First Action Interview Pre-Interview Communication dated Dec. 2, 2014", 5 pgs.
"U.S. Appl. No. 14/332,306, First Action Interview Pre-Interview Communication dated May 20, 2016", 5 pgs.
"U.S. Appl. No. 14/473,860, First Action Interview dated Nov. 4, 2014", 23 pgs.
"U.S. Appl. No. 14/473,860, Notice of Allowance dated Jan. 5, 2015", 13 pgs.
"U.S. Appl. No. 14/479,160, First Action Interview Pre-Interview Communication dated Apr. 20, 2016", 7 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/571,098, First Action Interview dated Aug. 24, 2015", 4 pgs.

(56) References Cited

OTHER PUBLICATIONS

"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/601,735, Final Office Action dated May 3, 2018", 29 pgs.
"U.S. Appl. No. 14/601,735, Final Office Action dated Jul. 11, 2017", 25 pgs.
"U.S. Appl. No. 14/601,735, Non Final Office Action dated Nov. 15, 2017", 28 pgs.
"U.S. Appl. No. 14/676,621, Notice of Allowance dated Feb. 10, 2016", 5 pgs.
"U.S. Appl. No. 14/715,834, Final Office Action dated Jun. 28, 2016", 13 pgs.
"U.S. Appl. No. 14/715,834, First Action Interview Pre-Interview Communication dated Feb. 19, 2016", 19 pgs.
"U.S. Appl. No. 14/715,834, First Action Interview Pre-Interview Communication dated Apr. 13, 2016", 21 pgs.
"U.S. Appl. No. 14/741,256, Restriction Requirement dated Feb. 9, 2016", 6 pgs.
"U.S. Appl. No. 14/800,447, Examiner Interview Summary dated Mar. 3, 2016", 28 pgs.
"U.S. Appl. No. 14/800,447, Final Office Action dated Jun. 6, 2016", 15 pgs.
"U.S. Appl. No. 14/800,447, First Action Interview—Pre-Interview Communication dated Dec. 10, 2015", 6 pgs.
"U.S. Appl. No. 14/841,338, Non Final Office Action dated Feb. 18, 2016", 39 pgs.
"U.S. Appl. No. 14/842,734, First Action Interview Pre-Interview Communication dated Nov. 19, 2015", 17 pgs.
"U.S. Appl. No. 14/871,465, First Action Interview Pre-Interview Communication dated Feb. 9, 2016", 32 pgs.
"U.S. Appl. No. 14/871,465, First Action Interview Pre-Interview Communication dated Apr. 11, 2016", 7 pgs.
"U.S. Appl. No. 14/883,498, First Action Interview Pre-Interview Communication dated Dec. 24, 2015", 33 pgs.
"U.S. Appl. No. 14/883,498, Non Final Office Action dated Mar. 17, 2016", 18 pgs.
"U.S. Appl. No. 14/961,481, Notice of Allowance dated May 2, 2016", 6 pgs.
"U.S. Appl. No. 14/961,481, Pre-Interview Communication dated Mar. 2, 2016", 12 pgs.
"U.S. Appl. No. 14/975,215, First Action Interview Pre-Interview Communication dated May 19, 2016", 5 pgs.
"U.S. Appl. No. 15/051,565, Final Office Action dated Mar. 19, 2018", 15 pgs.
"U.S. Appl. No. 15/051,565, Final Office Action dated Jun. 28, 2017", 12 pgs.
"U.S. Appl. No. 15/051,565, Non Final Office Action dated Apr. 6, 2017", 11 pgs.
"U.S. Appl. No. 15/051,565, Non Final Office Action dated Oct. 18, 2017", 14 pgs.
"U.S. Appl. No. 15/051,565, Notice of Allowance dated Jun. 1, 2018", 6 pgs.
"Australian Application Serial No. 2013251186, First Examiner's Report dated Mar. 12, 2015", 3 pgs.
"Australian Application Serial No. 2013251186, Notice of Acceptance dated Nov. 6, 2015", 2 pgs.
"Bug 18726—[feature] Long-click means of invoking contextual menus not supported", Bugzilla@Mozilla, [Online] retrieved from the internet: <http://bugzilla.mozilla.org/show_bug.cgi?id=18726>, (Jun. 13, 2013), 11 pgs.
"Canadian Application Serial No. 2,831,660, Office Action dated Jun. 9, 2015", 4 pgs.
"Clip2Net—Share files, folders and screenshots easily", Online Tech Tips, [Online]. Retrieved from the Internet: <URL: http://www.online-tech-tips.com/free-software-downloads/share-files-folders-screenshots/>, (Apr. 2, 2008), 5 pgs.
"European Application Serial No. 15190307.7, Extended Search Report dated Feb. 19, 2016", 8 pgs.
"European Application Serial No. 12181585.6, Communication pursuant to Article 94(3) EPC dated Sep. 4, 2015", 9 pgs.
"European Application Serial No. 14158861.6, Extended European Search Report dated Jun. 16, 2014", 6 pgs.
"European Application Serial No. 14159464.8, Extended European Search Report dated Jul. 31, 2014", 7 pgs.
"European Application Serial No. 14159464.8, Non Final Office Action dated Sep. 22, 2014", 2 pgs.
"European Application Serial No. 14159464.8, Notice of Publication dated Aug. 20, 2014", 2 pgs.
"European Application Serial No. 14189344.6, Office Action dated Feb. 29, 2016", 9 pgs.
"European Application Serial No. 15188106.7, Extended European Search Report dated Feb. 3, 2016", 8 pgs.
"European Application Serial No. 16207360.5, Extended European Search Report dated Jun. 16, 2017", w/ English Translation, 8 pgs.
"Getting Started with VBA in Word 2010", Microsoft—Developer Network,, [Online] retrieved from the internet: <http://msdn.microsoft.com/en-us/library/ff604039%28v=office.14%29.aspx>, (Apr. 4, 2014), 17 pgs.
"GIS-NET 3 Public—Department of Regional Planning", Planning & Zoning Information for Unincorporated LA County, [Online] retrieved from the internet: <http://qis.planninq.lacounty.gov/GIS-NET3_Public/Viewer.html>, (Oct. 2, 2013).
"GrabUp—What a Timesaver!", [Online]. Retrieved from the Internet: <URL http://atlchris.com/191/grabup/>, (Aug. 11, 2008), 10 pgs.
"Great Britain Application Serial No. 1404457.2, Office Action dated Aug. 14, 2014", 8 pgs.
"Great Britain Application Serial No. 1404486.1, Combined Search Report and Examination Report dated Aug. 27, 2014", 5 pgs.
"Great Britain Application Serial No. 1404489.5, Combined Search Report and Examination Report dated Aug. 27, 2014", 5 pgs.
"Great Britain Application Serial No. 1404499.4, Combined Search Report and Examination Report dated Aug. 20, 2014", 6 pgs.
"Great Britain Application Serial No. 1404574.4, Office Action dated Dec. 18, 2014".
"Great Britain Application Serial No. 1408025.3, Office Action dated Nov. 6, 2014", 3 pgs.
"Great Britain Application Serial No. 1411984.6, Office Action dated Dec. 22, 2014", 6 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Kwout", [Online]. Retrieved from the Internet: <URL: http://web.archive.org/web/20080905132448/http://www.kwout.com/>, (Sep. 5, 2008), 2 pgs.
"Map of San Jose, CA", Retrieved Oct. 2, 2013 from http://maps.google.com, (Oct. 2, 2013), 1 pg.
"Map of San Jose, CA.", Retrieved Oct. 2, 2013 from http://maps.yahoo.com, (Oct. 2, 2013), 1 pg.
"Map of San Jose, CA.", Retrieved Oct. 2, 2013 from http://maps.bing.com, (Oct. 2, 2013), 1 pg.
"Microsoft Windows Version 2002 Print Out 2", Microsoft Windows, (2002), 6 pgs.
"Netherlands Application Serial No. 2011729, Search Report dated Aug. 13, 2015", 8 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 622517, Office Action dated Apr. 3, 2014", 3 pgs.
"New Zealand Application Serial No. 624557, Office Action dated May 14, 2014", 2 pgs.

(56) References Cited

OTHER PUBLICATIONS

"New Zealand Application Serial No. 627962, Office Action dated Aug. 5, 2014", 2 pgs.
"New Zealand Application Serial No. 628161, First Examination Report dated Aug. 25, 2014", 2 pgs.
"New Zealand Application Serial No. 628263, Office Action dated Aug. 12, 2014", 2 pgs.
"New Zealand Application Serial No. 628495, Office Action dated Aug. 19, 2014", 2 pgs.
"New Zealand Application Serial No. 628585, Office Action dated Aug. 26, 2014", 2 pgs.
"New Zealand Application Serial No. 628840, Office Action dated Aug. 28, 2014", 2 pgs.
"O'Reilly.com", [Online]. Retrieved from the Internet: <URL: http://oreilly.com/digitalmedia/2006/01/01/mac-os-x-screenshot-secrets.html, (Jan. 1, 2006), 10 pgs.
"Registering an Application to a URI Scheme", Microsoft, [Online]. Retrieved from the Internet: <URL: http://msdn.microsoft.com/en-us/library/aa767914.aspx>, (accessed Apr. 4, 2009), 4 pgs.
"Share Screenshots via Internet in Seconds", JetScreenshot.com, [Online]. Retrieved from the Internet: <URL: http://web.archive.org/web/20130807164204/http://www.jetscreenshot.com/>, (Aug. 7, 2013), 1 pg.
"SnagIt 8.1.0 Print Out", SnagIt Software release date Jun. 15, 2006, (Jun. 15, 2006), 6 pgs.
"SnagIt 8.1.0 Print Out 2", Snagit—Software release date Jun. 15, 2006, (Jun. 15, 2006), 1-3.
"SnagIt Online Help Guide", TechSmith Corp., Version 8.1, http://download.techsmith.com/snagit/docs/onlinehelp/enu/snagit_help.pdf>, (accessed Feb. 7, 2007), 284 pgs.
"The FASTA Program Package", fasta-36.3.4, (Mar. 25, 2011), 1-29.
"Trick: How to Capture a Screenshot As PDF, Annotate, Then Share It", Nitro, [Online]. Retrieved from the Internet: <URL: http://blog.nitropdf.com/2008/03/04/trick-how-to-capture-a-screenshot-as-pdf-annotate-it-then-share/>, (Mar. 4, 2008), 2 pgs.
"Using the Clipboard", Microsoft, [Online]. Retrieved from the Internet: <URL: http://msdn.microsoft.com/en-us/library/ms649016.aspx>, (accessed Jun. 8, 2009), 20 pgs.
"Visualizing Threats: Improved Cyber Security Through Network Visualization", Keylines.com, [Online] retrieved from the internet: <http://keylines.com/wp-content/uploads/2014/04/Visualizing-Threats1.pdf>, (May 12, 2014), 10 pgs.
Abbey, Kristen, "Review of Google Docs", 2007: Currents in Electronic Literacy, http://currents.dwrl.utexas.edu/spring07/abbey.html, (May 1, 2007), 2 pgs.
Acklen, Laura, "Absolute Beginner's Guide to Microsoft Office Word 2003", (Dec. 24, 2003), 15-18, 34-41, 308-316.
Adams, Michael, et al., "Worklets: A Service-Oriented Implementation of Dynamic Flexibility in Workflows", OTM 2006, LNCS 4275, (2006), 291-308.
Ananiev, et al., "The New Modality API", Sun Developer Network (SDN), [Online] retrieved from the internet: <http://web.archive.org/web/20061211011958/http://java.sun.com/developer/technicaiArticles/J2SE/Desktop/javase6/modality/>, (Jan. 21, 2006), 12 pgs.
Bluttman, et al., "Excel Formulas and Functions for Dummies", Wiley Publishinq, Inc., (2005), 280, 284-286.
Canese, Kathi, et al., "Chapter 2: PubMed: The Bibliographic Database", The NCBI Handbook, (Oct. 2002), 1-10.
Chaudhuri, Surajit, et al., "An Overview of Business Intelligence Technology", Communications of the ACM, vol. 54, No. 8., (Aug. 2011), 88-98.
Chen, et al., "Bringing Order to the Web: Automatically Categorizing Search Results", Proceedings of the SIGCHI conference on Human Factors in Computing Systems, The Hague, The Netherlands, (2000), 145-152.
Conner, Nancy, "Remove a published document or blog post", Google Apps: The Missing Manual: The Missing Manual section—Sharing and Collaborating on Documents, XP-002721325, (2008), 15 pgs.
Delcher, Arthur, et al., "Identifying Bacterial Genes and Endosymbiont DNA with Glimmer", BioInformatics, vol. 23, No. 6, (2007), 673-679.
Dramowicz, Ela, "Retail Trade Area Analysis Using the Huff Model", Directions Magazine, [Online] retrieved from the internet: <http://www.directionsmag.com/articles/retail-trade-area-analysis-using-the-huff-model/123411>, (Jul. 2, 2005), 10 pgs.
Ferreira, Lucas De Carvalho, et al., "A Scheme for Analyzing Electronic Payment Systems", (1997), 10 pgs.
Galliford, Miles, "SnagIt Versus Free Screen Capture Software: Critical Tools for Website Owners", [Online]. Retrieved from the Internet: <URL: http://www.subhub.com/articles/free-screen-capture-software>, (Mar. 27, 2008), 10 pgs.
Goswami, Gautam, "Quite Writely Said!", Blog: One Brick a Time, [Online]. Retrieved from the Internet: <URL: http://gautamg.wordpress.com/2006/08/21/quite-writely-said/>, (Aug 2005), 7 pgs.
Griffith, Daniel A, et al., "A Generalized Huff Model", Geographical Analysis, vol. 14, No. 2, (Apr. 1982), 135-144.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4, pp. 53-67 and Chapter 10, (Sep. 2010), 53-67; 143-164.
Hibbert, et al., "Prediction of Shopping Behavior Using a Huff Model Within a GIS Framework", (Mar. 18, 2011), 16 pgs.
Hua, Yu, et al., "A Multi-attribute Data Structure with Parallel Bloom Filters for Network Services", HiPC 2006, LNCS 4297, (2006), 277-288.
Huff, et al., "Calibrating the Huff Model Using ArcGIS Business Analyst", ESRI, (Sep. 2008), 33 pgs.
Huff, David L, "Parameter Estimation in the Huff Model", ESRI, ArcUser, (2003), 34-36.
Hunter, J, et al., "Collaborative Annotation of 3D Crystallographic Models", The University of Queensland, 10 pgs.
Jane, Huner, et al., "Towards Annotopia—Enabling the Semantic Interoperability of Web-Based Annotations", Future Internet, (2012), 19 pgs.
Kahan, J., et al., "Annotea: an open RDF Infrastructure for Shared Web Annotations", Computer Networks vol. 39, No. 5, Elsevier Science Publishers B.V., Amsterdam, NL, (2002), 589-608.
Kitts, Paul, "Chapter 14: Genome Assembly and Annotation Process", The NCBI Handbook, (Oct. 2002), 1-21.
Liu, T., "Combining GIS and the Huff Model to Analyze Suitable Locations for a New Asian Supermarket in the Minneapolis and St. Paul, Minnesota USA", Papers in Resource Analysis, 2012, vol. 14, (2012), 8 pgs.
Madden, "Chapter 16: BLAST Sequence Analysis Tool", The NCBI Handbook, (Oct. 2002), 1-15.
Manno, et al., "Introducing Collaboration in Single-user Applications through the Centralized Control Architecture", (2010), 10 pgs.
Manske, "File Saving Dialogs", [Online] retrieved from the internet: <http://www.mozilla.org/editor/ui_specs/FileSaveDialogs.html>, (Jan. 20, 1999), 7 pgs.
Mizrachi, Ilene, "Chapter 1: GenBank: The Nucleotide Sequence Database", The NCBI Handbook, (Oct. 2002), 1-14.
Nierman, Andrew, et al., "Evaluating Structural Similarity in XML Documents", U of Michigan, (2002), 1-6.
Palmas, et al., "An Edge-Bunding Layout for Interactive Parallel Coordinates", IEEE Pacific Visualization Symposium, (2014), 57-64.
Rouse, Margaret, "OLAP Cube", [Online] retrieved from the internet: <http://searchdatamanagement.techtarget.com/definition/OLAP-cube>, (Apr. 28, 2012), 15 pgs.
Schroder, Stan, "15 Ways to Create Website Screenshots", [Online]. Retrieved from the Internet: <URL: http://mashable.com/2007/08/24/web-screenshots/>, (Aug. 24, 2007), 2 pgs.
Sigrist, Christian, et al., "PROSITE, a Protein Domain Database for Functional Characterization and Annotation", Nucleic Acids Research, vol. 38, (2010), D161-D166.

(56) References Cited

OTHER PUBLICATIONS

Sirotkin, Karl, et al., "Chapter 13: The Processing of Biological Sequence Data at NCBI", The NCBI Handbook, (Oct. 2002), 1-11.
Wang, Guohua, et al., "Research on a Clustering Data De-Duplication Mechanism Based on Bloom Filter", IEEE, (2010), 5 pgs.
Warren, Christina, "TUAW Faceoff: Screenshot apps on the firing line", [Online]. Retrieved from the Internet: <URL: http://www.tuaw.com/2008/05/05/tuaw-faceoff-screenshot-apps-on-the-firing-line/>, (May 5, 2008), 11 pgs.
Yang, Yudong, "HTML Page Analysis Based on Visual Cues", 2001 IEEE, (2001), 859-864.
"European Application Serial No. 16207360.5, Communication Pursuant to Article 94(3) EPC dated Dec. 6, 2018", 6 pgs.
"European Application Serial No. 16207360.5, Summons to Attend Oral Proceedings dated Aug. 19, 2019", 5 pgs.

\* cited by examiner

400 

CAUSING DISPLAY OF THE USER GENERATED ANNOTATION AT A FIRST USER DEVICE
410

RECEIVING A COMMENT ON THE USER GENERATED ANNOTATION FROM THE FIRST USER DEVICE
420

CAUSING DISPLAY OF A NOTIFICATION OF THE COMMENT AT THE AUTHOR DEVICE
430

RECEIVING A SELECTION OF THE NOTIFICATION FROM THE AUTHOR DEVICE
440

CAUSING DISPLAY OF THE USER GENERATED ANNOTATION WITH THE COMMENT AT THE AUTHOR DEVICE
450

REAL-TIME DOCUMENT ANNOTATION

RELATED APPLICATIONS

This application is a continuation of and claims the priority benefit of U.S. patent application Ser. No. 15/051,565, filed Feb. 23, 2016, which claims the priority benefit of U.S. Provisional Application No. 62/272,617, filed Dec. 29, 2015, which are incorporated by reference herein in their entirety.

TECHNICAL FIELD

The subject matter disclosed herein relates to electronic document annotation. In particular, example embodiments may relate to techniques for receiving, allocating, managing, and displaying annotations on electronic documents.

BACKGROUND

Documents are often created and shared with groups of individuals to facilitate the exchange of information. Presentation programs, such as Microsoft PowerPoint, aid this effort by creating a medium in which a presenter (or group of presenters) can create presentation decks made up of slides containing visual and auditory content, which can then be presented to an individual or group of individuals in a slide show format. Individuals viewing the presentation often provide feedback to the presenter after the conclusion of the presentation, in the form of comments and questions, provided in-person, or at a later time, or as a red-lined hardcopy of the presentation itself. This collaborative effort is often the ultimate goal of presenting the information to a group of individuals in the first place, but can be impaired as a result of the inability to effectively provide, receive, and manage the feedback.

For example, in a traditional presentation, a presenter first creates and distributes a set of presentation documents in the form of a digital slide show delivered electronically, or as a printed hardcopy to a group of individuals. In a live presentation of the document, the presenter explains the content of the presentation to the group, pausing as a result of interruptions as a result of questions or comments related to the content of the presentation. These frequent pauses in the presentation can result in a segmented and disconnected explanation of topics, and may also result in the presenter losing their train of thought, slowing down the pace of the presentation, and possibly missing or skipping over important concepts.

In cases where the presentation is simply delivered to individuals to view on their own time, the presenter is then faced with the problem of receiving feedback and comments through multiple mediums (e.g., phone calls, in person conversations, red-lined hardcopies, or emails), as well as duplicative comments which become time consuming and frustrating to repeatedly address. As a result, many comments may remain unresolved, and the presentation may fail to incorporate valuable feedback which the presenter may have missed.

It is therefore valuable to devise systems and methods to facilitate and encourage the collaborative process, while avoiding the current cumbersome, time-consuming, and error-prone methods which exist currently.

BRIEF DESCRIPTION OF THE DRAWINGS

Various ones of the appended drawings merely illustrate example embodiments of the present inventive subject matter and cannot be considered as limiting its scope.

FIG. 4 is a flowchart illustrating a method for displaying annotations and receiving comments on the annotations from one or more users, consistent with some embodiments.

FIG. 7 is an interface diagram illustrating the user interface, comprising the newsfeed, updated to display annotation notifications, and an upload window, according to example embodiments.

DETAILED DESCRIPTION

Figure 1:
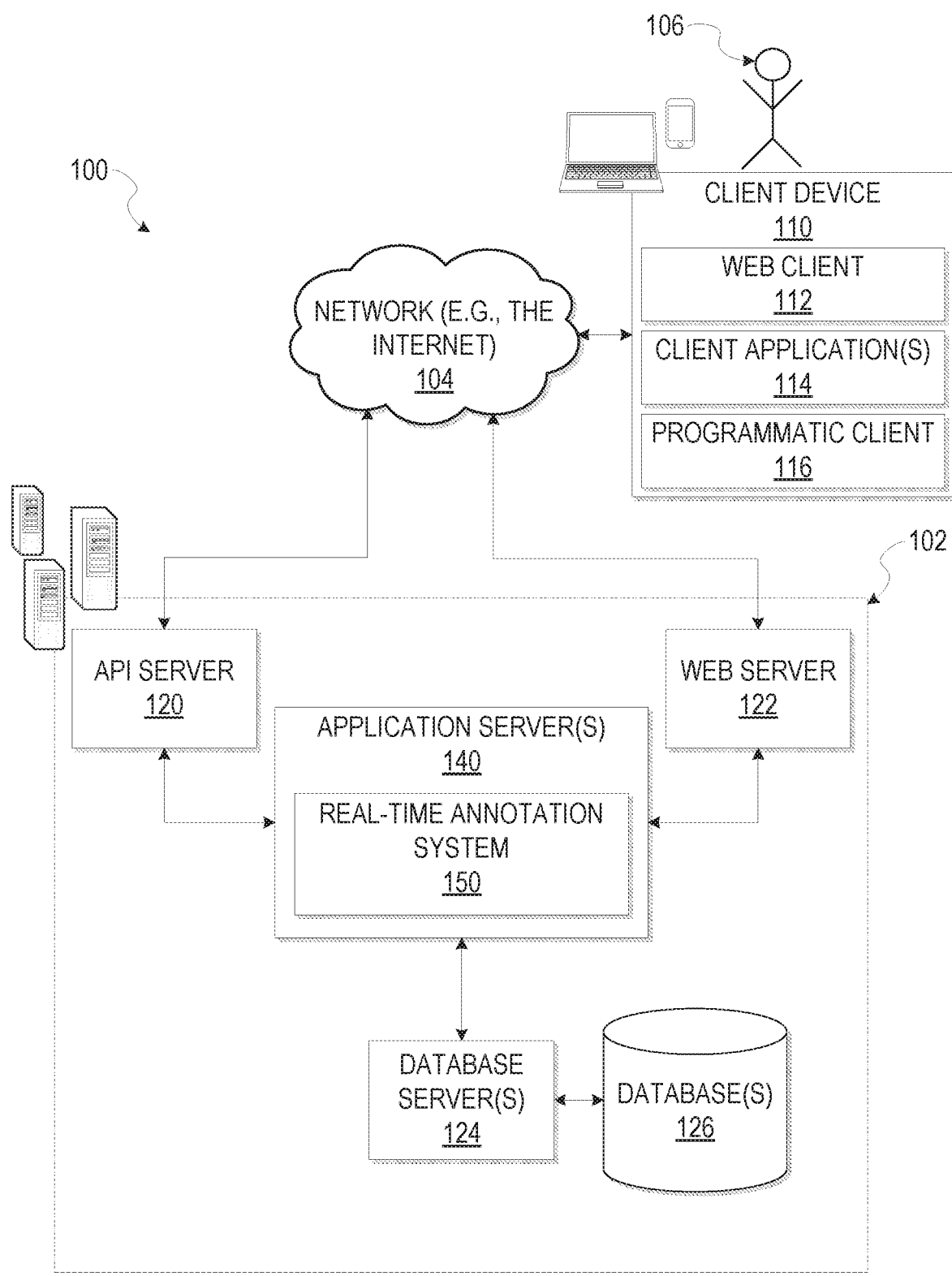
FIG. 1 is an architecture diagram depicting a presentation platform having a client-server architecture configured for exchanging data, according to an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure relate to systems and methods for receiving, managing, and displaying annotations on presentation objects in real-time. The presentation objects include electronic documents, such as PowerPoint® presentations, as well as simple word processing documents, and PDF files, and includes an arrangement of one or more presentation elements (e.g., graphics, text, videos, interactive web elements). A user (e.g., a human author of a document) uploads a presentation object(s) into a real-time annotation system, which generates a composite presentation based on the presentation object(s). The presentation object includes one or more user identifiers of users associated with the presentation object data, including, for example, an author of the presentation object, one or more users assigned to the presentation object, as well as a user who uploaded the presentation object into the real-time annotation system. The composite presentation is displayed within a graphical user interface (GUI), and the GUI includes one or more interactive elements overlaid on the composite presentation to receive and manage annotations from user devices, in real-time.

From a user perspective, the users viewing the composite presentation can provide annotations directly onto the GUI through an input component of a user device (e.g., mobile device or desktop computer) by a single or double-click of a mouse, or in the case of touch-enabled devices, a pre-defined tactile input (e.g., a tap, a swipe, etc.). For example, to provide an annotation on a particular presentation element within the composite presentation, a first user positions a cursor over a location in the GUI corresponding to a desired presentation element of the composite presentation, and provides a user input.

Responsive to receiving the user input, the real-time annotation system indicates receipt of the user input, for example by causing display of a dialogue box within the GUI, where the first user may provide additional annotation data. The annotation data may include, for example, a user identifier of the first user, a string of text (e.g., comments from users), an indication of approval or disapproval, an annotation type (e.g., a question, or a comment) a status indicator flag (e.g., resolved or unresolved), a reference to another user (e.g., a user identifier), as well as multimedia content (e.g., audio and video). The annotation data is then indexed and stored according to the user identifier of the first user, the annotation content, and the composite presentation. The real-time annotation system generates and displays a graphical element representative of the annotation data at the location within the GUI corresponding to the presentation element indicated by the first user. By selecting the graphical element, the annotation data is displayed in a separate window as a user generated annotation, for viewing by a user. For example, a user may select the graphical element by simply placing a cursor over a location of the graphical element within the GUI (e.g., hovering the cursor over the graphical element), as well as by providing an explicit selection of the graphical element (e.g., clicking).

In some embodiments, the graphical element generated by the real-time annotation system includes additional indicators to identify the specific annotation, as well as the annotation type. For example, annotations marked as a "question" may be displayed in red (or any other color), while annotations marked as a "comment" may be displayed as blue (or any other color).

Responsive to receiving the annotation data, the real-time annotation system causes a notification that the annotation data has been received to be displayed at the devices of the one or more users associated with the presentation object of the composite presentation. In this way, the real-time annotation system may notify the one or more users associated with a particular presentation object of annotations received on the composite presentation in real-time. The notification includes an identification of the composite presentation in which the annotation was made and a user identifier of the user who provided the annotation data. Responsive to selecting the notification, the real-time annotation system may cause display of the annotation data as a user generated annotation, which the user may interact with by, for example providing a response. The associated users may then review the user generated annotation, and provide any necessary response or feedback requested.

In some embodiments, the real-time annotation system maintains composite presentations associated with user identifiers, such that all composite presentations associated with a particular user may be accessed through a single GUI at the user device. For example, a composite presentation may be associated to a user identifier based on the user having authored or uploaded the document, the user placing an annotation on the document, or an annotation on the document referencing the user. The real-time annotation system causes display of a user interface which includes a presentation of one or more graphical elements representing each of the associated composite presentations.

In some instances, the user generated annotation may include references to specific users, for example based on a user identifier. Responsive to receiving an annotation with a references to a specific user based on the user identifier, the real-time annotation system may cause display of a notification on a device of the specified user, which the specified user may then respond to.

In additional example embodiments, the user generated annotations may also include additional GUI elements with functionality to receive follow requests, as well as assignment request to assign an annotation to a user based on a user identifier. For example, by selecting the follow request included in the GUI, a user may then be notified of all comments and other activities which occur in reference to the annotation. Similarly, by assigning the annotation to a user based on a user identifier, the assigned user may then be notified of all comments and activities which occur in reference to the annotation.

FIG. 1 is a network diagram illustrating a network environment 100 suitable for operating a real-time document annotation system 150. A presentation platform 102 provides server-side functionality, via a network 104 (e.g., an intranet, the Internet or a Wide Area Network (WAN)), to one or more clients such as the client device 110. FIG. 1 illustrates a web client 112, client applications 114, and a programmatic client 116 executing on respective client device 110.

An Application Program Interface (API) server 120 and a web server 122 are coupled to, and provide programmatic and web interfaces respectively to, one or more application servers 140. The application servers 140 host the real-time annotation system 150. The application servers 140 are, in turn, shown to be coupled to one or more database servers 124 that facilitate access to one or more databases 126.

A real-time annotation system 150 provides real-time document annotation management functions for the presentation platform 102. For example, the real-time annotation system 150 receives a document (or documents) and generates a composite presentation document configured to receive annotation data from user devices in real-time.

As shown, the network system 100 includes a client device 110 in communication with a presentation platform 102 over a network 104. The presentation platform 102 communicates and exchanges data with the client device 110 that pertains to various functions and aspects associated with the presentation platform 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the network system 100 to exchange data with the presentation platform 104 over the network 106.

The client device 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the presentation platform 102 may involve user-selected functions available through one or more user interfaces (UIs). The UIs may be specifically associated with a web client 112 (e.g., a browser) or an application 114, executing on the client device 110, and in communication with the presentation platform 102.

Turning specifically to the presentation platform 102, a web server 122 is coupled to (e.g., via wired or wireless interfaces), and provides web interfaces to, an application server 140. The application server 140 hosts one or more applications (e.g., web applications) that allow users to use various functions and services of the presentation platform 104. For example, the application server 140 may host a real-time annotation system 150 that provides a number of real-time document annotation management functions. In some embodiments, the real-time annotation system 150 runs and executes on the application server 140, while in other embodiments, the application server 140 provides the client device 110 with a set of instructions (e.g., computer-readable code) that causes the web client 112 of the client device 110 to execute and run the real-time annotation system 150. The real-time annotation system 150 receives presentation objects and generates composite presentations based on the presentation objects.

The presentation objects received and ingested by the real-time annotation system 150 may, for example, include a presentation slideshow (e.g., PowerPoint presentation) made up of a set of one or more presentation documents. Each of the presentation documents included within the presentation slideshow may include a set of presentation elements in the form of auditory or visual content (e.g., images, text strings, audio files, etc.).

The real-time annotation system 150 receives the presentation object (e.g., presentation slideshow) as presentation data delivered from a client device (e.g., client device 110), and store the presentation object within a database (e.g., database 126), at a memory location associated with the user of the client device. The real-time annotation system 150 then generates a composite presentation based on the presentation data. The composite presentation generated by the real-time presentation system 150 includes the presentation data received from the client device, overlaid with elements of a GUI configured to receive and manage annotation data from one or more users in real-time.

Figure 2:
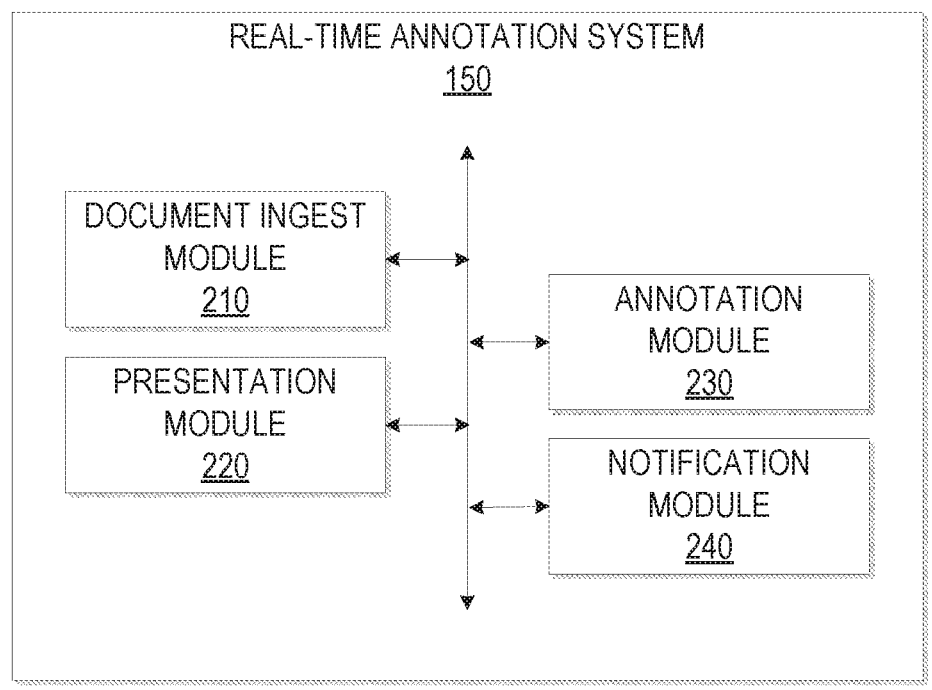
FIG. 2 is a block diagram illustrating various modules comprising a real-time annotation system, which is provided as part of the presentation platform, consistent with some embodiments.

FIG. 2 is a block diagram illustrating various modules comprising the real-time annotation system 150, which is provided as part of the presentation platform 102, consistent with some embodiments. As is understood by skilled artisans in the relevant computer and Internet-related arts, the modules and engines illustrated in FIG. 2 represent a set of executable software instructions and the corresponding hardware (e.g., memory and processor) for executing the instructions. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the real-time annotation system 150 to facilitate additional functionality that is not specifically described herein. Furthermore, the various functional modules and engines depicted in FIG. 2 may reside on a single computer (e.g., a client device), or may be distributed across several computers in various arrangements such as cloud-based architectures.

The real-time annotation system 150 is shown as including a document ingest module 210, a presentation module 220, an annotation module 230, and a notification module 240, all configured to communicate with each other (e.g., via a bus, shared memory, a switch, or application programming interfaces (APIs)). The aforementioned modules of the real-time annotation system 150 may, furthermore, access one or more databases that are part of the presentation platform 102 (e.g., database 126), and each of the modules may access one or more computer-readable storage media of the client device 110.

The document ingest module 210 receives presentation data from various client computing devices, and communicates appropriate responses to the requesting client devices to indicate receipt of the documents. The document ingest module 210 may receive presentation data from client devices. For example, the document ingest module 210 provides a number of interfaces (e.g., APIs or user interfaces that are presented by the client device 102) that allow users to upload data (e.g., documents).

The presentation module 220 is configured to access the ingested presentation data, and generate a composite presentation to display within a GUI at a client device. The composite presentation is displayed within a GUI, and the GUI includes one or more interactive elements overlaid on the composite presentation to receive and manage annotations from user devices, in real-time. The composite presentation includes one or more user identifiers of users associated with the presentation data.

Additionally, the presentation module 220 causes display of additional user interfaces that include graphical representations of the various annotation options provided by the real-time annotation system 150. These user interfaces may include various interface elements to share, assign, save, comment and open composite presentations. The presentation module 220 also receives and processes user input received through such user interfaces. Examples of the user interfaces provided by the presentation module 220 are discussed below in reference to FIGS. 4-7.

The annotation module 230 is configured to receive and manage annotation data received from client devices (e.g., client device 110). For example, users (e.g., user 106) viewing the composite presentation at a client device may provide one or more annotations related to the presentation data of the composite presentation. The annotation module 230 is configured to receive the annotation data and store the annotation data at a memory location in a database (e.g., database 126) associated with the composite presentation. The annotation data includes, for example: location data indicating a location which the annotation is directed to; user identifiers associated with the user providing the annotation; users referenced within the annotation; annotation content such as a text string; and annotation identification information such as data indicating an annotation type.

The notification module 240 is configured to generate and cause display of notifications responsive to the annotation module 230 providing an indication that annotation data has been received from a client device. For example, responsive to receiving an indication that the annotation module 230 has received annotation data from a client device, the notification module 240 generates a notification of the annotation to be displayed at one or more client devices. The notification of the annotation may include, for example, the annotation data, including the user identifier of the user which provided the annotation, as well as an indication of the composite presentation which the annotation applies to. The notification module 240 may then cause display of the notification at a client device of all users associated with the notification. Users associated with the notification include, for example, any users referenced within the annotation (e.g., based on a user identifier), the author of the composite presentation, a user who originally uploaded the document into the real-time annotation system 150, and the users who provide annotations.

Figure 3:
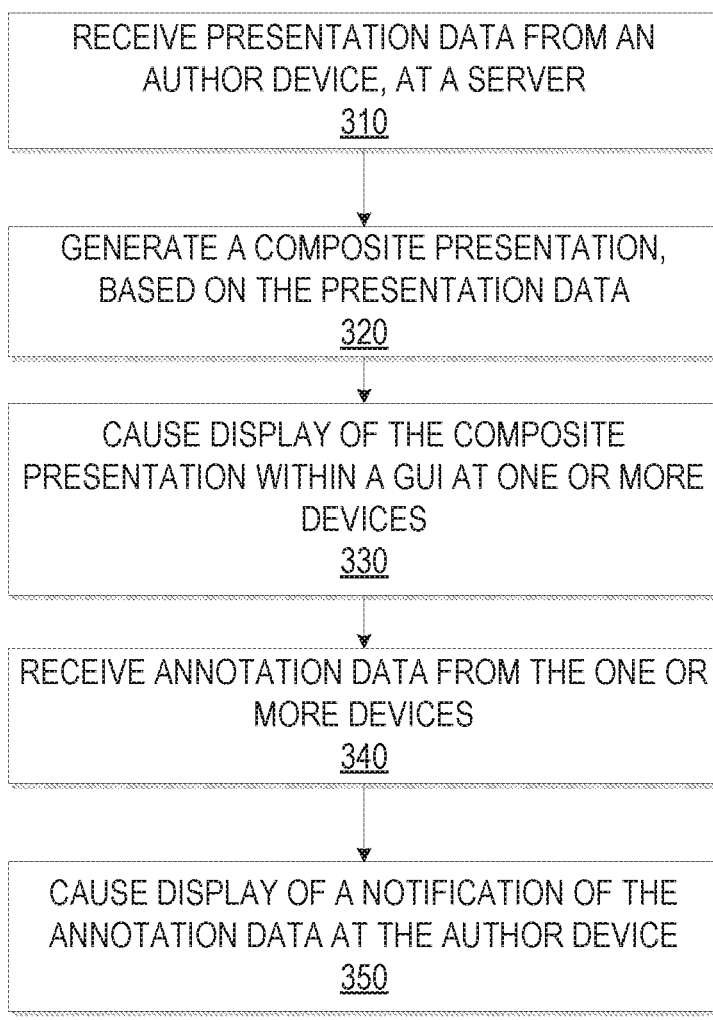
FIG. 3 is a flowchart illustrating a method for receiving and managing annotations on documents in real-time, consistent with some embodiments.

FIG. 3 is a flowchart illustrating a method 300 for receiving and managing annotations on documents in real-time, consistent with some embodiments. The method 300 may be embodied in computer-readable instructions for execution by one or more processors such that the operations of the method 300 may be performed in part or in whole by the application server 140. In particular, the operations of the method 300 may be performed in part or in whole by the real-time annotation system 150; accordingly, the method 300 is described below by way of example with reference thereto. However, it shall be appreciated that at least some of the operations of the method 300 may be deployed on various other hardware configurations and the method 300 is not intended to be limited to the application server 140 or the real-time annotation system 150.

At operation 310, the document ingest module 210 receives presentation data from a client device (e.g., client device 110). The presentation data may include one or more presentation documents comprising presentation content. After receiving the presentation data, the document ingest module 210 allocates a memory location for the presentation data within the database 126, and stores the presentation data in the database 126.

At operation 320, responsive to receiving an indication that the real-time annotation system 150 has received presentation data, the presentation module 220 accesses the memory location associated with the presentation data and generates a composite presentation including the presentation data and one or more associated user identifiers. The presentation module 220 causes display of the composite presentation overlaid with a GUI, the GUI including functionality to receive and manage annotations from one or more client devices viewing the composite presentation.

At operation 330, the presentation module 220 causes display of the composite presentation at one or more client devices. The composite presentation may be displayed responsive to receiving an invitation to view the composite presentation from another user (e.g., the author of the presentation, or another user with access to the presentation). For example a user may access the composite presentation through a GUI of the real-time annotation system 150 at their user device. The user may select a graphical element representative of the composite presentation, and responsive to receiving an indication that the graphical element has been selected, the presentation module 220 causes display of the composite presentation.

At operation 340, the annotation module 230 receives annotation data from one or more client devices on which the composite presentation is presented. The annotation data may include a string of text, a user identifier associated with the user providing the annotation, a location within a composite presentation which the annotation applies, and an identifier associated with the composite presentation itself. In some instances, the annotation data may also include one or more user identifiers referenced by the annotating user. In this way, the system may provide notifications to the users associated with the one or more user identifiers of the annotation.

At operation 350, the notification module 240 receives an indication that annotation data has been received, and generates a notification to be displayed at one or more client devices. The notification may be displayed as a text box with a first portion of the text box including a string of text or other indicator (e.g., a graphical element) referencing a corresponding composite presentation, and a second portion of the text box includes a user identifier indicating a user who created the annotation. In some embodiments, the notification may also include an indication of an annotation type (e.g., question or comment), as well as a timestamp indicating a time and date in which the annotation was first received. A user may then access the corresponding composite presentation by selecting the notification. Responsive to a selection of the notification, the real-time annotation system 150 may then cause display of the composite presentation, along with the user generated annotation itself.

In some embodiments, the annotation data may also include a status indicator, indicating whether the user generated annotation has been resolved or unresolved. For example, the user generated annotation may include annotation data indicating a question requiring a response. The status indicator of the annotation may indicate that the annotation is "unresolved," until a comment is provided, or a user switches the state of the annotation to "resolved" by providing an input from a client device. Once the annotation has been marked resolved, the display of the notification of the annotation may disappear from the GUI.

FIG. 4 is a flowchart illustrating a method 400 for displaying user generated annotations and receiving comments on the user generated annotations from one or more users, consistent with some embodiments. The method 400 may be embodied in computer-readable instructions for execution by one or more processors such that the operations of the method 400 may be performed in part or in whole by the application server 140. In particular, the operations of the method 400 may be performed in part or in whole by the real-time annotation system 150; accordingly, the method 400 is described below by way of example with reference thereto. However, it shall be appreciated that at least some of the operations of the method 400 may be deployed on various other hardware configurations and the method 400 is not intended to be limited to the application server 140 or the real-time annotation system 150.

As discussed above, in FIG. 3, the method 300 describes a method for receiving presentation data, and generating and displaying a composite presentation overlaid with a GUI configured to receive and manage user generated annotations in real-time from one or more user devices. The method 400 may initiate at a point in which a user has received a notification of a user generated annotation, and provided an indication that the user generated annotation be displayed at the user device. At operation 410, the annotation module 230 causes display of the user generated annotation pertaining to a composite presentation within a graphical user interface of the real-time annotation system 150. The user generated annotation may have been received from another user accessing the composite presentation, or alternatively could have been created by the viewing user themselves. The user generated annotation may be displayed as graphical element represented as a text box including a first portion which includes a text string (e.g., a question or comment), a second portion which indicates a source of the annotation (e.g., a user identifier), and a third portion which may include a text field to provide an annotation comment to the annotation. In some instances, the user generated annotation may also include an annotation identifier (e.g., a number, letter, or other form of identification).

At operation 420, the user viewing the user generated annotation provides a comment on the user generated annotation. The user may initiate the comment by selecting the user generated annotation and providing an annotation comment as a text string directly into a text field of the user generated annotation. The annotation comment may include additional text, pertaining to the annotation, as well as one or more references to additional users (e.g., based on user identifiers).

At operation 430, responsive to receiving an indication of the annotation comment from the user device, the notification module 240 generates and causes display of a notification at the user devices of the associated users. The associated users include the author of the composite presentation (or user who uploaded the presentation deck into the real-time annotation system), the user who provided the annotation on which the comment was received, as well as any users referenced in the comment itself, or who may have commented on the annotation. The notification may include a reference to the annotation on which the comment was received, a reference to the corresponding composite presentation, as well as a user identifier associated with the user who provided the comment.

At operation 440, the notification module 240 receives an indication of a selection of the notification from a user device. Responsive to the notification module 240 receiving the selection, at operation 450, the annotation module 230 causes display of the user generated annotation at the user device, including the most recent comment.

Figure 5:
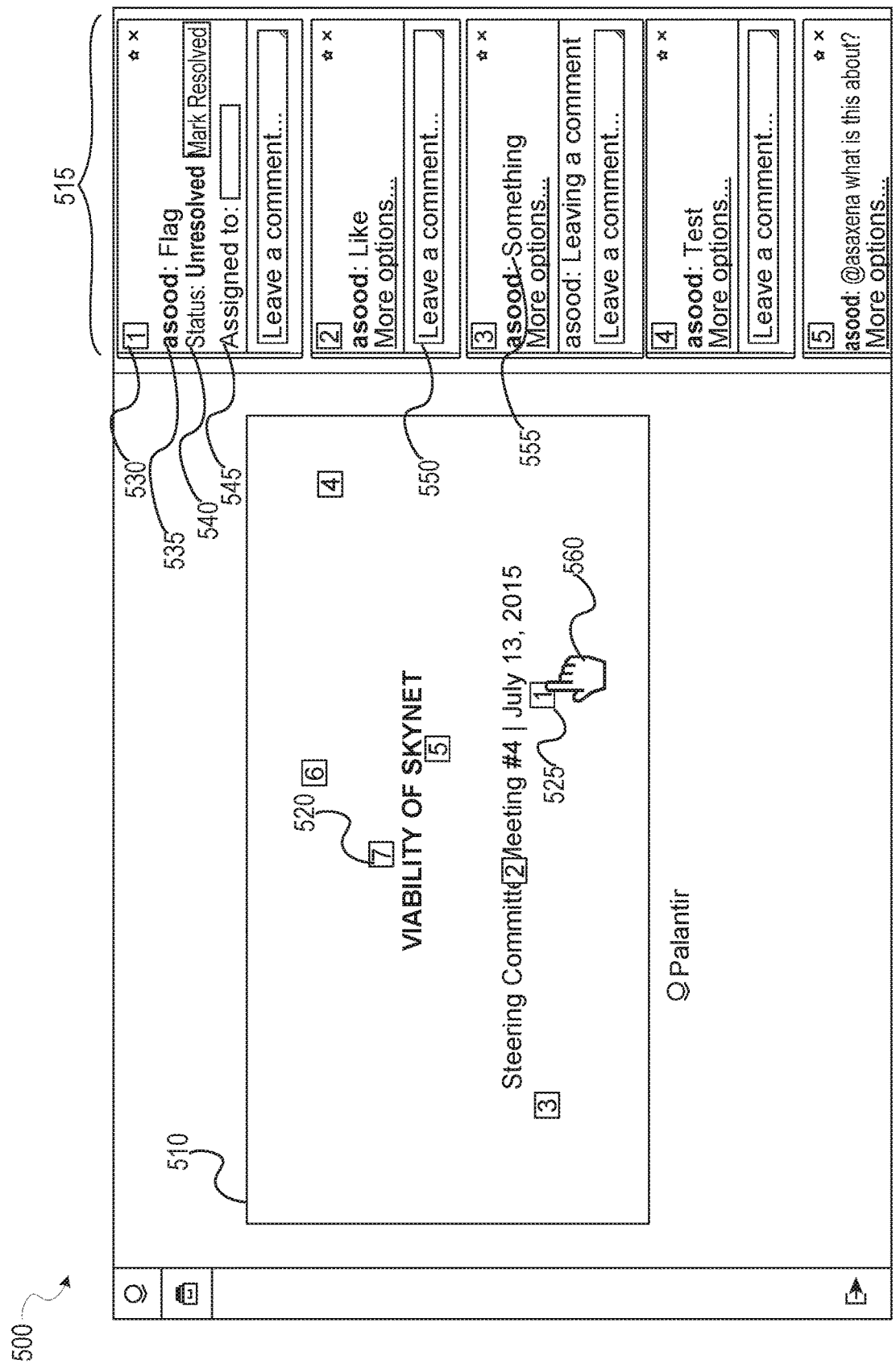
FIG. 5 is an interface diagram illustrating a composite presentation, comprising a graphical user interface overlaid on a composite presentation, according to example embodiments.

FIG. 5 is an interface diagram illustrating a composite presentation 510 overlaid with a GUI 500, according to example embodiments. The composite presentation 510 is shown to include, a set of user generated annotations 515, each of the user generated annotations within the set of user generated annotations 515, and graphical elements (e.g., 520 and 525) to represent a reference location of a corresponding user generated annotation, and a cursor 560 to place annotations on the composite presentation 510.

In some embodiments, the user generated annotations 515 are generated responsive to an input received from a client device (e.g., client device 110), via the cursor 560. For example a user may move the cursor 560 over a location in the composite presentation 510 within the GUI 500 and provide a user input (e.g., a single or double click). Responsive to the received user input, the real-time annotation system 150 generates and places a graphical element (e.g., 520, 525) at the location of the cursor 560 in the GUI 500. Each graphical element may be visually distinct from one another, for example, by numbering, unique colors or patterns, or labels. As shown in FIG. 5, each graphical element includes a unique number identifying an associated annotation among the user generated annotations 515.

The user generated annotations (e.g., 515) created are then displayed within a portion of the GUI 500. The user generated annotation may include an annotation identifier 530, in order to identify a corresponding graphical element (e.g., graphical element 525) associated with the annotation, a source identifier 535 (e.g., a user identifier), identifying a user who created/placed the user generated annotation on the composite presentation 510, a status indicator 540, to indicate a status of the annotation (e.g., resolved or unresolved), an assignment field 545, where a user may assign the user generated annotation to one or more users, based on one or more user identifiers, a comment field 550, where a user may provide a comment onto the user generated annotation, and annotation content 555, which may include a text string, an indication of approval or disapproval (e.g., a like or dislike), or simply a flag to alert a recipient of a particular element within the composite presentation 510.

Figure 6:
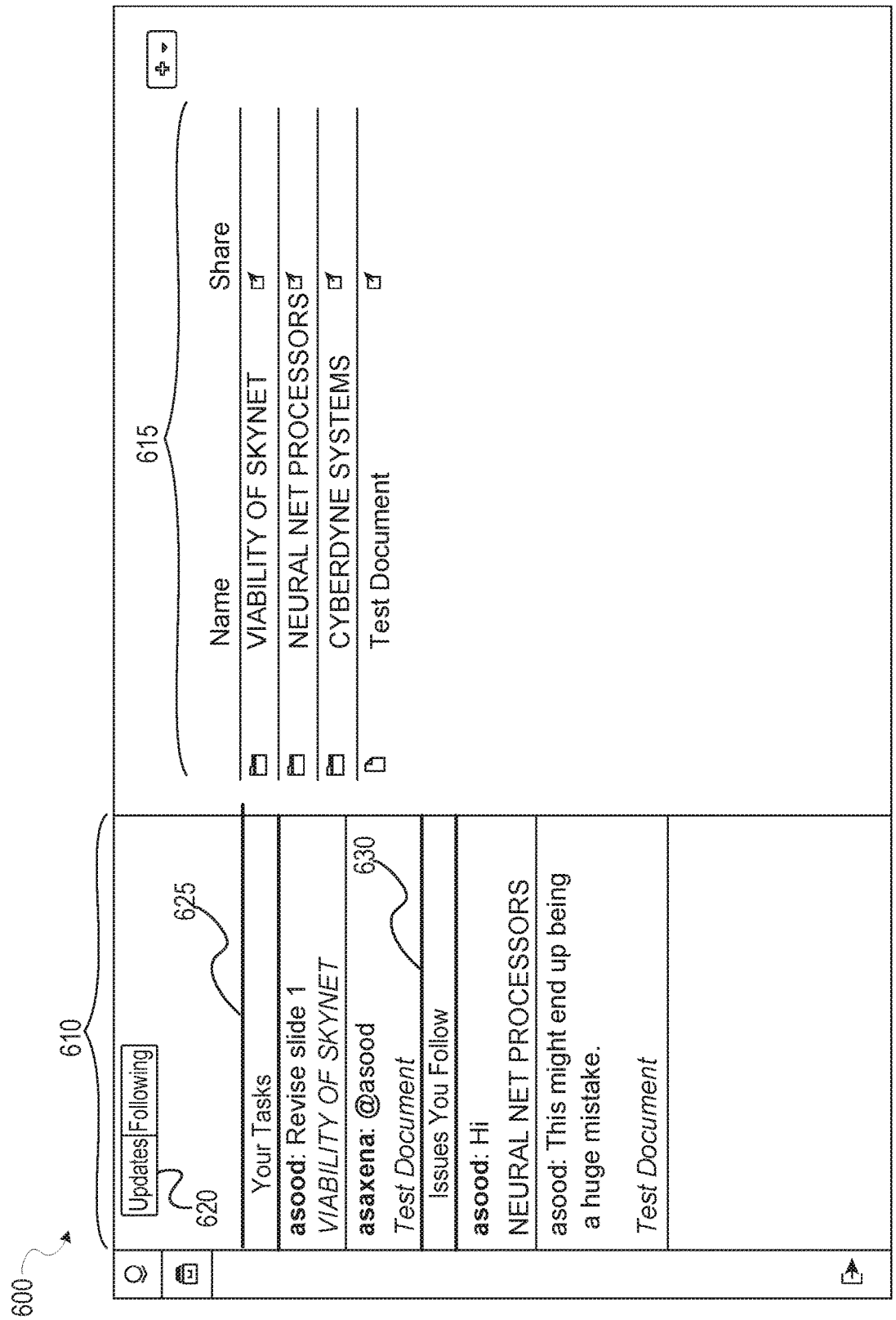
FIG. 6 is an interface diagram illustrating a user interface, comprising a newsfeed, and a document repository, according to example embodiments.

FIG. 6 is an interface diagram illustrating a GUI 600, comprising a newsfeed 610, and a document repository 615, according to example embodiments. In some embodiments, the newsfeed 610 may include a switch 620 to toggle between various types of content to be displayed within the newsfeed 610. For example, the switch 620 may toggle the content displayed between an updates section and an annotations section, wherein the updates section displays annotation notifications in real-time, and the annotations section displays abbreviated annotations. The newsfeed displayed in FIG. 6 depicts the annotations section.

The annotations section of the newsfeed 610 comprises a list of all user generated annotations which the user accessing the GUI 600 has created, has been assigned, or is following. As shown, the section may be separated into a personal tasks section 625 to display annotations which the user themselves has created, and a following section 630 to display annotations which the user is following (e.g., requested updates for).

A document repository 615 includes an arrangement of graphical representations of all documents which a user is associated with. As stated above, a user may be associated with a document if they uploaded the document into the real-time annotation system 150, created an annotation on a composite presentation, received an assignment on an annotation, or were referenced in a comment or annotation by a user identifier.

Figure 7:
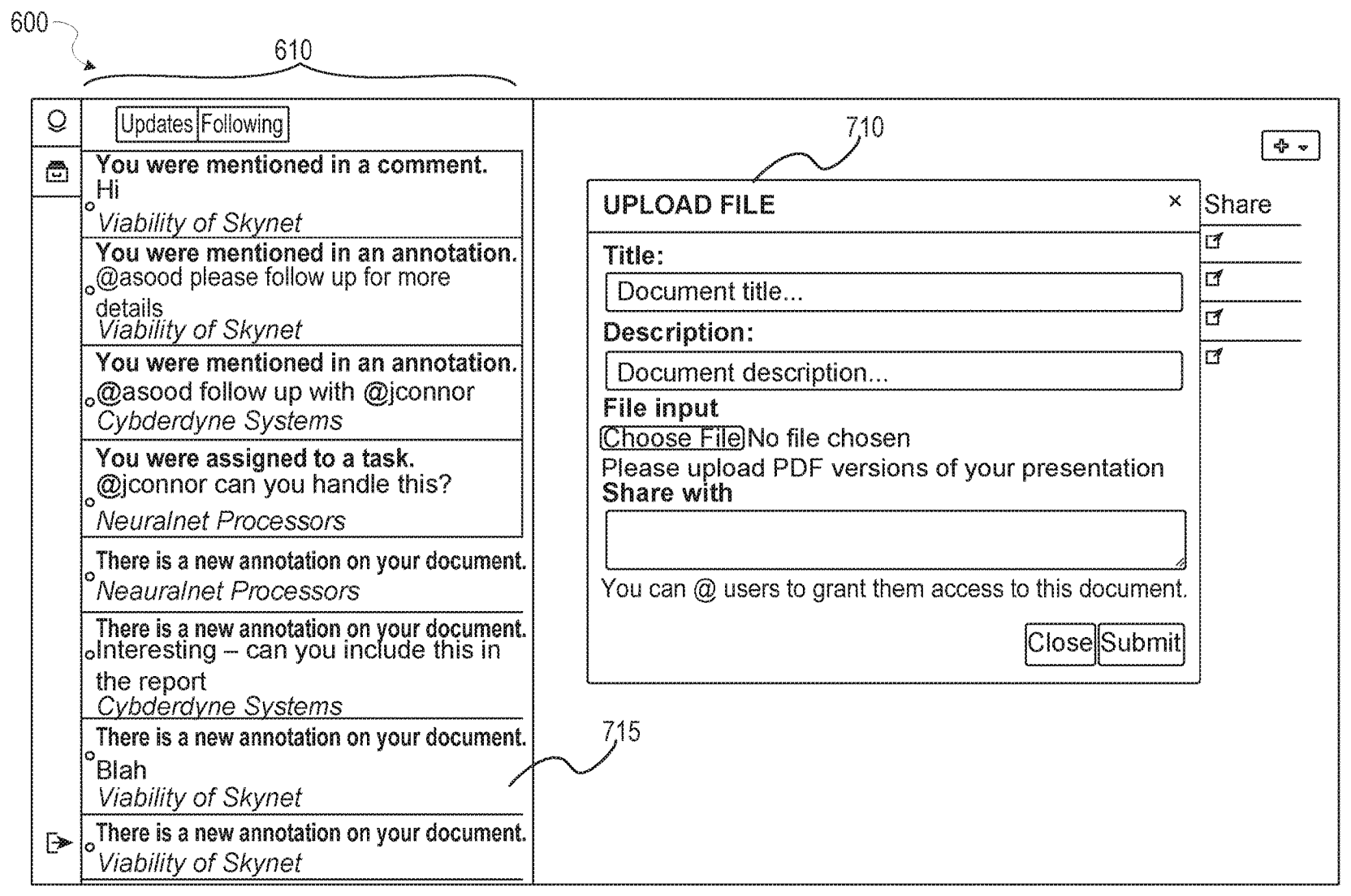

FIG. 7 is an interface diagram illustrating the GUI 600, comprising the newsfeed 610, updated to display annotation notifications (e.g., annotation notification 715), and an upload window 710, according to example embodiments. The annotation notifications are received from one or more client devices and displayed in real-time. In some embodiments, the user may sort the annotation notifications in the order they are received, with the most recently received annotations at the top of the newsfeed 610, and the older annotations preceding.

The annotation notifications include an indication of the nature of the notification (e.g., "you were mentioned in the comment," "you were mentioned in an annotation," "you were assigned to a task"), an indication of what composite presentation the annotation is regarding (e.g., "Test Document"), as well as a text string. The user may access the corresponding composite presentation by selecting a desired annotation notification from among the set of annotation notifications displayed.

The upload window 710 enables users to upload presentation data into the real-time annotation system 150. Upon uploading the presentation data via the upload window 710, the real-time annotation system 150 stores the document within the database 126, and generates a composite presentation based on the uploaded document. A user may also provide a title for the document, a description for the document, and a file type of the document. In some embodiments, the uploading user may also share the document with one or more additional users by including a set of user identifiers into the upload window 710.

Modules, Components, and Logic

Certain embodiments are described herein as including logic or a number of components, modules, or mechanisms.

Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable

Figure 8:
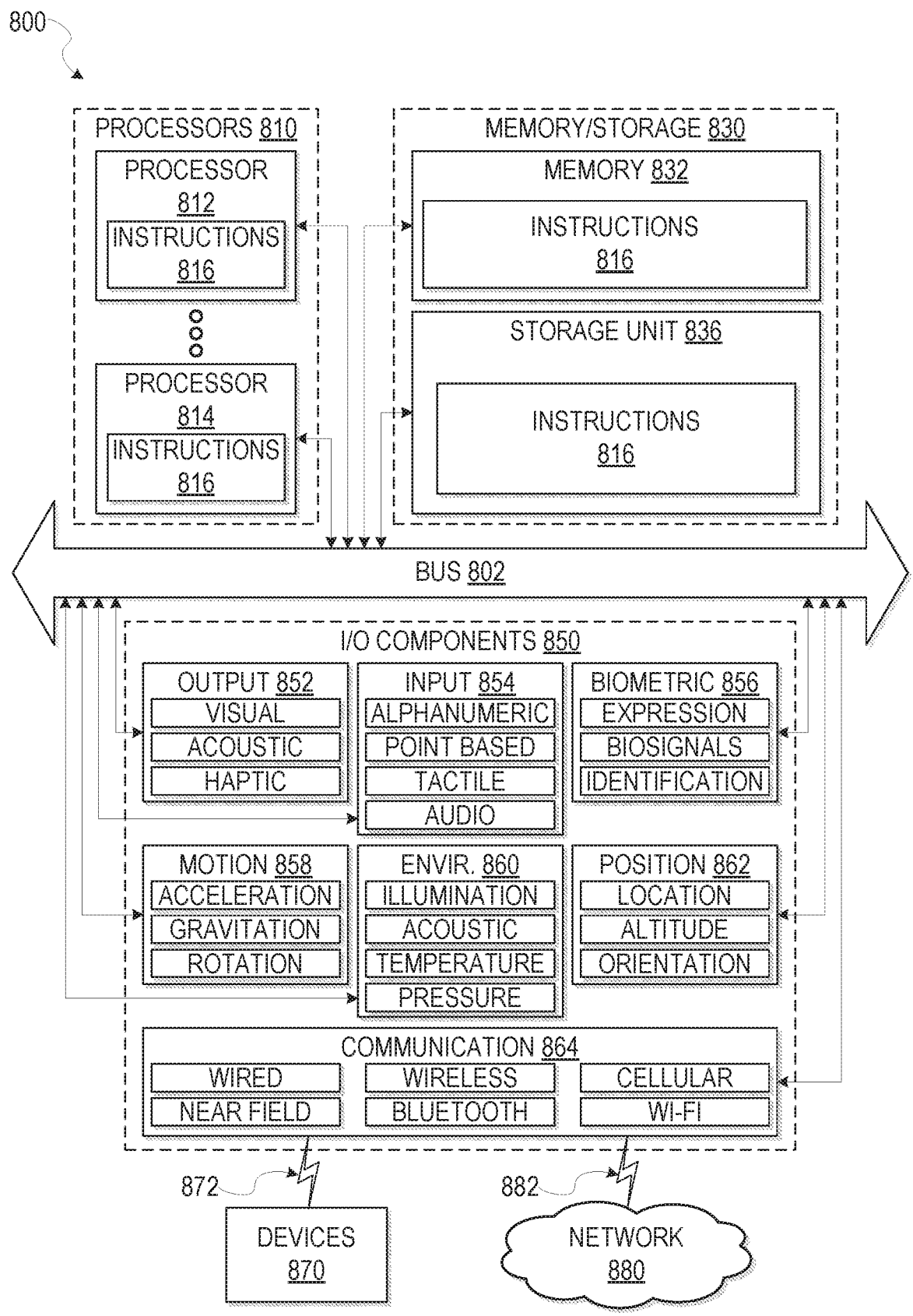
FIG. 8 is a diagrammatic representation of a machine in the example form of a computer system within which a set of instructions for causing the machine to perform any one or more of the methodologies discussed herein may be executed.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. Additionally, or alternatively, the machine 800 may correspond to any one of the client device 102, the web server 110, the application server 112, or the third-party computing system 118. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4117, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and using any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A method comprising:
generating a composite presentation based on a set of graphical elements, the composite presentation including the set of graphical elements overlaid with interactive elements configured to manage annotations to each of the graphical elements;
causing display of a graphical user interface at a plurality of devices, the graphical user interface including a first region and second region, the first region presenting the composite presentation and the second region including a listing of annotations to the set of graphical elements;
receiving, from a first client device from the plurality of devices, annotation data for a first graphical element from the set of graphical elements, the annotation data including an annotation type, and annotation content, the annotation data received through use of the first graphical element from the set of graphical elements, the first graphical element being overlaid on the first graphical element in the composite presentation;
in response to receiving the annotation data, updating the composite presentation to include an annotation identifier that corresponds to the annotation type included in the annotation data, the annotation identifier presented at a location within the composite presentation corresponding to the first graphical element from the set of graphical elements;
receiving, from a second client device from the plurality of devices, an input that selects the annotation identifier;
in response to receiving the input, causing display of the annotation content from the annotation data in the listing of annotations included in the second region of the graphical user interface presented on the second client device;
receiving, from the second client device, a comment to be associated with the annotation content, the comment including a user identifier; and
causing display of a notification at a third client device that corresponds with the user identifier, the notification comprising an identification of the annotation data.

2. The method of claim 1, wherein the annotation content includes multimedia content.

3. The method of claim 1, wherein the annotation content presented on the second client device further comprises a user identifier that identifies a user profile associated with the first client device.

4. The method of claim 1, wherein the annotation identifier includes a status indicator that indicates a first status, and wherein the method further comprises:
in response to receiving the comment, updating the status indicator to indicate a second status.

5. The method of claim 1, wherein causing display of the notification at the third client device comprises:
causing display of the annotation content from the annotation data in the listing of annotations included in the second region of the graphical user interface presented on the third client device.

6. The method of claim 1, further comprising:
receiving, from a fourth client device from the plurality of devices, second annotation data for a second graphical element from the set of graphical elements, the second annotation data including a second annotation type, and second annotation content, the second annotation data received through use of a second graphical element from the set of graphical elements, the second graphical element being overlaid on the second graphical element in the composite presentation.

7. The method of claim 6, further comprising:
in response to receiving the second annotation data, updating the composite presentation to include a second annotation identifier that corresponds to the second annotation type included in the second annotation data, the second annotation identifier presented at a location within the composite presentation corresponding to the second graphical element from the set of graphical elements.

8. A system comprising:
one or more computer processors; and
one or more computer-readable mediums storing instructions that, when executed by the one or more computer processors, cause the system to perform operations comprising:
generating a composite presentation based on a set of graphical elements, the composite presentation including the set of graphical elements overlaid with interactive elements configured to manage annotations to each of the graphical elements;
causing display of a graphical user interface at a plurality of devices, the graphical user interface including a first region and second region, the first region presenting the composite presentation and the second region including a listing of annotations to the set of graphical elements;
receiving, from a first client device from the plurality of devices, annotation data for a first graphical element from the set of graphical elements, the annotation data including an annotation type, and annotation content, the annotation data received through use of the first graphical element from the set of graphical elements, the first graphical element being overlaid on the first graphical element in the composite presentation;
in response to receiving the annotation data, updating the composite presentation to include an annotation identifier that corresponds to the annotation type included in the annotation data, the annotation identifier presented at a location within the composite presentation corresponding to the first graphical element from the set of graphical elements;

receiving, from a second client device from the plurality of devices, an input that selects the annotation identifier;

in response to receiving the input, causing display of the annotation content from the annotation data in the listing of annotations included in the second region of the graphical user interface presented on the second client device;

receiving, from the second client device, a comment to be associated with the annotation content, the comment including a user identifier; and causing display of a notification at a third client device that corresponds with the user identifier, the notification comprising an identification of the annotation data.

9. The system of claim 8, wherein the annotation content includes multimedia content.

10. The system of claim 8, wherein the annotation content presented on the second client device further comprises a user identifier that identifies a user profile associated with the first client device.

11. The system of claim 8, wherein the annotation identifier includes a status indicator that indicates a first status, and wherein the operations further comprise:

in response to receiving the comment, updating the status indicator to indicate a second status.

12. The system of claim 8, wherein causing display of the notification at the third client device comprises:

causing display of the annotation content from the annotation data in the listing of annotations included in the second region of the graphical user interface presented on the third client device.

13. The system of claim 8, the operations further comprising:

receiving, from a fourth client device from the plurality of devices, second annotation data for a second graphical element from the set of graphical elements, the second annotation data including a second annotation type, and second annotation content, the second annotation data received through use of a second graphical element from the set of graphical elements, the second graphical element being overlaid on the second graphical element in the composite presentation.

14. The system of claim 13, the operations further comprising:

in response to receiving the second annotation data, updating the composite presentation to include a second annotation identifier that corresponds to the second annotation type included in the second annotation data, the second annotation identifier presented at a location within the composite presentation corresponding to the second graphical element from the set of graphical elements.

15. A non-transitory computer-readable medium storing instructions that, when executed by one or more computer processors of one or more computing devices, cause the one or more computing devices to perform operations comprising:

generating a composite presentation based on a set of graphical elements, the composite presentation including the set of graphical elements overlaid with interactive elements configured to manage annotations to each of the graphical elements;

causing display of a graphical user interface at a plurality of devices, the graphical user interface including a first region and second region, the first region presenting the composite presentation and the second region including a listing of annotations to the set of graphical elements;

receiving, from a first client device from the plurality of devices, annotation data for a first graphical element from the set of graphical elements, the annotation data including an annotation type, and annotation content, the annotation data received through use of the first graphical element from the set of graphical elements, the first graphical element being overlaid on the first graphical element in the composite presentation;

in response to receiving the annotation data, updating the composite presentation to include an annotation identifier that corresponds to the annotation type included in the annotation data, the annotation identifier presented at a location within the composite presentation corresponding to the first graphical element from the set of graphical elements;

receiving, from a second client device from the plurality of devices, an input that selects the annotation identifier;

in response to receiving the input, causing display of the annotation content from the annotation data in the listing of annotations included in the second region of the graphical user interface presented on the second client device;

receiving, from the second client device, a comment to be associated with the annotation content, the comment including a user identifier; and causing display of a notification at a third client device that corresponds with the user identifier, the notification comprising an identification of the annotation data.

16. The non-transitory computer-readable of claim 15, wherein the annotation content includes multimedia content.

17. The non-transitory computer-readable of claim 15, wherein the annotation content presented on the second client device further comprises a user identifier that identifies a user profile associated with the first client device.

18. The non-transitory computer-readable of claim 15, wherein the annotation identifier includes a status indicator that indicates a first status, and wherein the operations further comprise:

in response to receiving the comment, updating the status indicator to indicate a second status.

19. The non-transitory computer-readable of claim 15, wherein causing display of the notification at the third client device comprises:

causing display of the annotation content from the annotation data in the listing of annotations included in the second region of the graphical user interface presented on the third client device.

20. The non-transitory computer-readable of claim 15, the operations further comprising:

receiving, from a fourth client device from the plurality of devices, second annotation data for a second graphical element from the set of graphical elements, the second annotation data including a second annotation type, and second annotation content, the second annotation data received through use of a second graphical element from the set of graphical elements, the second graphical element being overlaid on the second graphical element in the composite presentation; and in response to receiving the second annotation data, updating the composite presentation to include a second annotation identifier that corresponds to the second annotation type included in the second annotation data, the second annotation identifier presented at a location within the composite presentation corresponding to the second graphical element from the set of graphical elements.

* * * * *